(12) United States Patent
Kerner et al.

(10) Patent No.: US 12,183,980 B2
(45) Date of Patent: Dec. 31, 2024

(54) ELECTRONIC DEVICES WITH CONCURRENT RADIO-FREQUENCY TRANSMISSION AND SENSING

(71) Applicant: Apple Inc., Cupertino, CA (US)

(72) Inventors: Michael Kerner, Tel Mond (IL); Flavio De Angelis, San Diego, CA (US); Gilad Kirshenberg, Ra'anana (IL); Mik Cohen, Tel Aviv-Jaffa (IL); Roman Rainov, Herzliya (IL); Sharad Sambhwani, San Diego, CA (US)

(73) Assignee: Apple Inc., Cupertino, CA (US)

( * ) Notice: Subject to any disclaimer, the term of this patent is extended or adjusted under 35 U.S.C. 154(b) by 654 days.

(21) Appl. No.: 17/368,413

(22) Filed: Jul. 6, 2021

(65) Prior Publication Data

US 2023/0008446 A1 Jan. 12, 2023

(51) Int. Cl.
*H01Q 21/24* (2006.01)
*H01Q 21/06* (2006.01)
*H04B 1/69* (2011.01)
*H04B 7/10* (2017.01)

(52) U.S. Cl.
CPC ......... *H01Q 21/245* (2013.01); *H01Q 21/065* (2013.01); *H04B 1/69* (2013.01); *H04B 7/10* (2013.01); *H04B 2001/6912* (2013.01)

(58) Field of Classification Search
CPC ...... H01Q 21/245; H01Q 21/065; H04B 1/69; H04B 7/10; H04B 2001/6912
See application file for complete search history.

(56) References Cited

U.S. PATENT DOCUMENTS

| | | | |
|---|---|---|---|
| 10,741,906 B2 | 8/2020 | Gomez Angulo et al. | |
| 10,826,177 B2 | 11/2020 | Mow et al. | |
| 10,830,867 B2 * | 11/2020 | Lin | G01S 13/86 |
| 10,971,815 B1 * | 4/2021 | West | H01Q 21/24 |
| 11,089,595 B1 * | 8/2021 | Frigon | H01Q 21/065 |
| 11,115,136 B1 * | 9/2021 | Kim | H04B 17/13 |
| 11,175,388 B1 * | 11/2021 | Wood | G01S 17/34 |
| 2009/0273505 A1 | 11/2009 | Pearson et al. | |
| 2019/0044561 A1 * | 2/2019 | Fernando | G01S 13/08 |
| 2019/0271776 A1 | 9/2019 | Davis et al. | |

(Continued)

*Primary Examiner* — Olumide Ajibade Akonai
*Assistant Examiner* — Yonghong L
(74) *Attorney, Agent, or Firm* — Treyz Law Group, P.C.; Michael H. Lyons

(57) ABSTRACT

An electronic device may include communications circuitry, sensing circuitry, and a set of antennas having first and second feeds for covering different polarizations. The communications circuitry may transmit signals with a first polarization using each of the antennas and may concurrently transmit signals with a second polarization using all but a selected one of the antennas. The sensing circuitry may concurrently transmit sensing signals with the first polarization using one of the antennas and may receive sensing signals with the second polarization using the selected antenna. The sensing signals may include chirp signals generated to include muted periods that correspond to a range of frequencies that overlap frequencies at which the wireless circuitry is subject to radio-frequency interference. This may allow for concurrent wireless communications and sensing operations without interference between the communications circuitry and the sensing circuitry.

20 Claims, 14 Drawing Sheets

(56) References Cited

U.S. PATENT DOCUMENTS

| | | | |
|---|---|---|---|
| 2020/0150260 A1 | 5/2020 | Lang et al. | |
| 2020/0182964 A1 | 6/2020 | Di Nallo et al. | |
| 2020/0319327 A1* | 10/2020 | Tsvelykh | G01S 13/933 |
| 2020/0393536 A1* | 12/2020 | Stettiner | G01S 13/343 |
| 2021/0231771 A1* | 7/2021 | Bengtsson | H04B 7/06966 |
| 2021/0328680 A1* | 10/2021 | Ke | H04B 10/5055 |
| 2022/0109951 A1* | 4/2022 | Tadayon | H04B 1/69 |

* cited by examiner

184

| | T1 | T2 | T3 |
|---|---|---|---|
| ANTENNA 30-1 | H COMMS V SENSING | H + V COMMS NO SENSING | H + V COMMS NO SENSING |
| ANTENNA 30-2 | H COMMS V SENSING | H + V COMMS NO SENSING | H + V COMMS NO SENSING |
| ANTENNA 30-3 | H COMMS V SENSING | H + V COMMS NO SENSING | H + V COMMS NO SENSING |
| ANTENNA 30-4 | H COMMS V SENSING | H + V COMMS NO SENSING | H + V COMMS NO SENSING |

TIME →

*FIG. 11*

ELECTRONIC DEVICES WITH CONCURRENT RADIO-FREQUENCY TRANSMISSION AND SENSING

FIELD

This disclosure relates generally to electronic devices and, more particularly, to electronic devices with wireless circuitry.

BACKGROUND

Electronic devices are often provided with wireless capabilities. An electronic device with wireless capabilities has wireless circuitry that includes one or more antennas. The wireless circuitry is used to perform communications using radio-frequency signals transmitted by the antennas.

In some scenarios, the wireless circuitry is also used to perform sensing to detect the presence of external objects near the electronic device. If care is not taken, the sensing can undesirably interfere with the communications, or the communications can undesirably interfere with the sensing.

SUMMARY

An electronic device may include wireless circuitry controlled by one or more processors. The wireless circuitry may include communications circuitry having one or more communications transmitters for performing wireless communications. The wireless circuitry may include sensing circuitry having a sensing transmitter and a sensing receiver for performing sensing operations. The wireless circuitry may include a set of antennas. Each antenna in the set of antennas may have a first antenna feed and a second antenna feed for covering orthogonal linear polarizations.

The communications circuitry may transmit radio-frequency signals with a first linear polarization using each of the antennas in the set of antennas. The communications circuitry may concurrently transmit radio-frequency signals with the second linear polarization using all but one of the antennas in the set of antennas. The sensing transmitter may concurrently transmit radio-frequency sensing signals with the first linear polarization using one of the antennas in the set of antennas. The sensing receiver may receive radio-frequency sensing signals with the second linear polarization using the antenna in the set of antennas that is not used by the communications circuitry to transmit radio-frequency signals with the second linear polarization. Switching circuitry may be adjusted to change the antennas and polarizations used for performing communications operations and sensing operations over time.

The radio-frequency sensing signals may include chirp signals. The received radio-frequency sensing signals may include a reflected version of the chirp signals that has been reflected off an external object. One or more processors may process the chirp signals and the reflected version of the chirp signals to detect the presence, location, orientation, and/or velocity of the external object. The one or more processors may identify interference frequencies at which potential interference may be present between the sensing circuitry and other radio-frequency signals such as the signals transmitted by the communications circuitry or over-the-air signals in the vicinity of the device. The chirp signals may be generated to include muted periods that correspond to a range of frequencies overlapping the interference frequencies. This may mitigate any such potential interference.

The one or more processors may control the communications circuitry to transmit radio-frequency signals using both linear polarizations while the sensing circuitry is inactive. The one or more processors may also control the sensing circuitry to perform sensing operations using one or both linear polarizations while the communications circuitry is inactive. In addition, when the communications circuitry only uses one of the linear polarizations for transmitting radio-frequency signals, the one or more processors may control the sensing circuitry to concurrently perform sensing operations using the other linear polarization. In this way, the wireless circuitry can convey wireless communications data concurrently with performing sensing operations without interference between the communications circuitry and the sensing circuitry.

An aspect of the disclosure provides an electronic device. The electronic device can include a first antenna having a first antenna feed and a second antenna feed. The electronic device can include a second antenna having a third antenna feed and a fourth antenna feed. The electronic device can include one or more communications transmitters configured to concurrently transmit first radio-frequency signals with a first polarization over the first antenna feed, second radio-frequency signals with the first polarization over the third antenna feed, and third radio-frequency signals with a second polarization over the second antenna feed, the second polarization being different from the first polarization. The electronic device can include a sensing transmitter configured to transmit radio-frequency sensing signals with the first polarization over the first antenna feed concurrently with transmission of the first radio-frequency signals by the one or more communications transceivers. The electronic device can include a sensing receiver configured to receive reflected radio-frequency sensing signals of the second polarization over the fourth antenna feed.

An aspect of the disclosure provides a method of operating an electronic device having one or more communications transmitters, a sensing transmitter, a sensing receiver, a set of antennas, and one or more processors. The method can include with the one or more communications transmitters, transmitting radio-frequency signals with a first linear polarization over the set of antennas during a first time period. The method can include with the sensing transmitter, transmitting sensing signals with a second linear polarization over the set of antennas concurrently with transmission of the radio-frequency signals by the one or more communications transceivers during the first time period, the second linear polarization being orthogonal to the first linear polarization. The method can include with the sensing receiver, receiving a reflected version of the sensing signals. The method can include with the one or more processors, detecting an external object based on the reflected version of the sensing signals received by the sensing receiver.

An aspect of the disclosure provides a method of operating an electronic device having one or more processors and wireless circuitry that includes a sensing transmitter, a sensing receiver, a first antenna, and a second antenna. The method can include with the one or more processors, identifying a first range of frequencies associated with potential radio-frequency interference at the wireless circuitry. The method can include with the sensing transmitter, generating chirp signals having muted periods that correspond to a second range of frequencies that overlaps the first range of frequencies. The method can include with the sensing transmitter, transmitting the chirp signals over the first antenna. The method can include with the sensing receiver, receiving a reflected version of the chirp signals over the second antenna. The method can include with the one or more processors, detecting an external object based at least on the reflected version of the chirp signals received by the sensing receiver.

BRIEF DESCRIPTION OF THE DRAWINGS

FIG. 11 is an illustrative table showing how wireless circuitry may use different polarizations to perform sensing operations and wireless communications in accordance with some embodiments.

DETAILED DESCRIPTION

Figure 1:
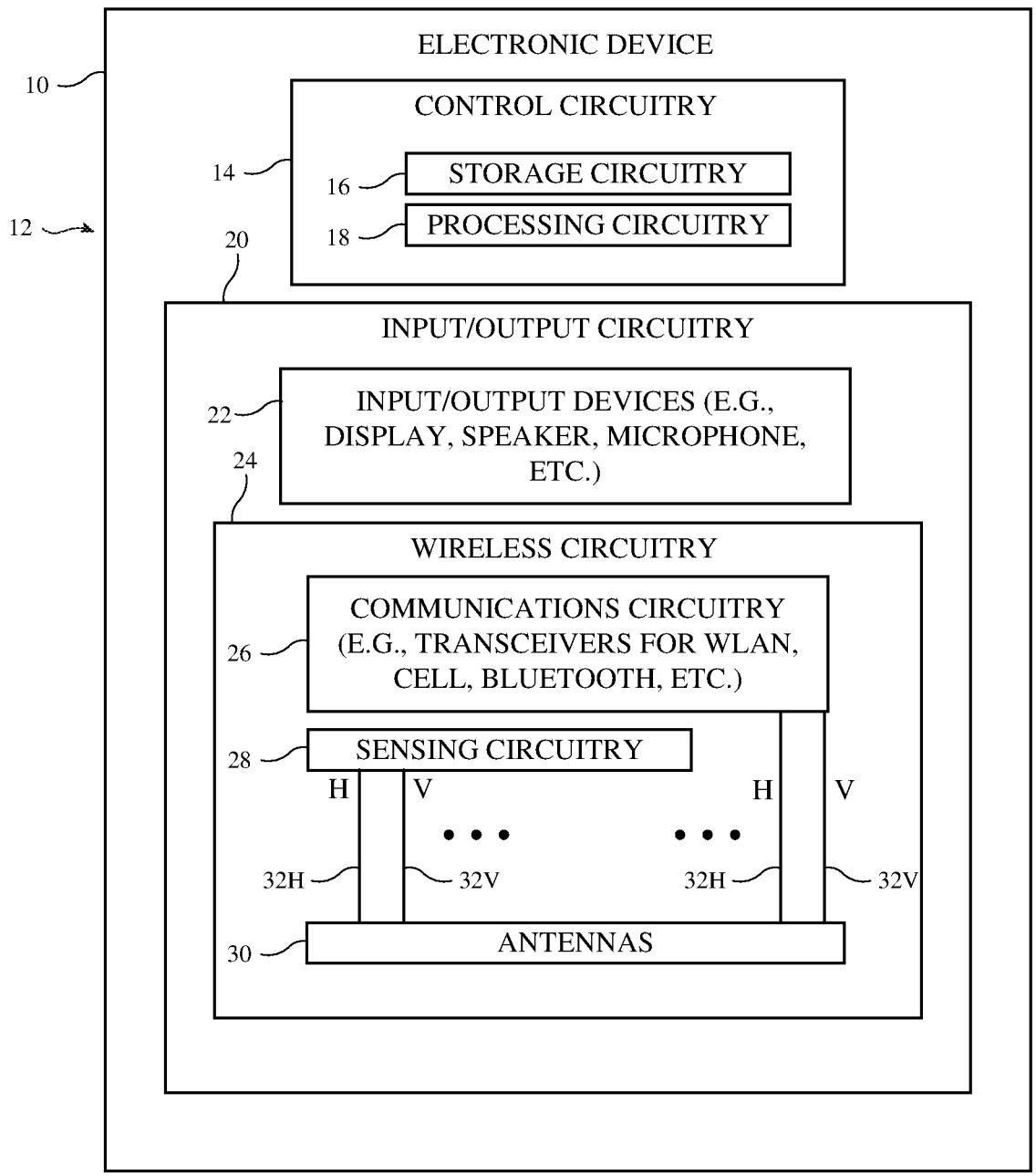
FIG. 1 is a block diagram of an illustrative electronic device having communications circuitry for performing wireless communications using antennas and having sensing circuitry for performing sensing operations using the antennas in accordance with some embodiments.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors, microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, etc.), antenna diversity protocols, satellite navigation system protocols (e.g., global positioning system (GPS) protocols, global navigation satellite system (GLONASS) protocols, etc.), antenna-based spatial ranging protocols, or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications and radio-based sensing operations. Wireless circuitry 24 (sometimes referred to herein as wireless communications circuitry 24) may include two or more antennas 30. Wireless circuitry 24 may also include baseband processor circuitry, transceiver circuitry, amplifier circuitry, filter circuitry, switching circuitry, analog-to-digital converter (ADC) circuitry, digital-to-analog converter (DAC) circuitry, radio-frequency transmission lines, and/or any other circuitry for transmitting and/or receiving radio-frequency signals using antennas 30.

Antennas 30 may be formed using any desired antenna structures for conveying radio-frequency signals. For example, antennas 30 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antennas 30 over time. If desired, two or more of antennas 30 may be integrated into a phased antenna array (sometimes referred to herein as a phased array antenna) in which each of the antennas conveys radio-frequency signals with a respective phase and magnitude that is adjusted over time so the radio-frequency signals constructively and destructively interfere to produce a signal beam in a given pointing direction. The term "convey radio-frequency signals" as used herein means the transmission and/or reception of the radio-frequency signals (e.g., for performing unidirectional and/or bidirectional wireless communications with external wireless communications equipment). Antennas 30 may transmit the radio-frequency signals by radiating the radio-frequency signals into free space (or to free space through intervening device structures such as a dielectric cover layer). Antennas 30 may additionally or alternatively receive the radio-frequency signals from free space (e.g., through intervening devices structures such as a dielectric cover layer). The transmission and reception of radio-frequency signals by antennas 30 each involve the excitation or resonance of antenna currents on an antenna resonating element in the antenna by the radio-frequency signals within the frequency band(s) of operation of the antenna.

Wireless circuitry 24 may include communications circuitry 26 (sometimes referred to herein as wireless communications circuitry 26) for transmitting and/or receiving wireless communications data using antennas 30. Communications circuitry 26 may include baseband circuitry (e.g., one or more baseband processors) and one or more radios (e.g., radio-frequency transceivers, modems, etc.) for conveying radio-frequency signals using one or more antennas 30. Communications circuitry 26 may use antennas 30 to transmit and/or receive radio-frequency signals that convey the wireless communications data between device 10 and external wireless communications equipment (e.g., one or more other devices such as device 10, a wireless access point or base station, etc.). The wireless communications data may be conveyed bidirectionally or unidirectionally. The wireless communications data may, for example, include data that has been encoded into corresponding data packets such as wireless data associated with a telephone call, streaming media content, Internet browsing, wireless data associated with software applications running on device 10, email messages, etc.

Communications circuitry 26 may transmit and/or receive radio-frequency signals within corresponding frequency bands at radio frequencies (sometimes referred to herein as communications bands or simply as "bands"). The frequency bands handled by communications circuitry 26 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-300 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

In addition to conveying wireless communications data, wireless circuitry 24 may also use antennas 30 to perform radio-frequency sensing operations (sometimes referred to herein as radio-based sensing operations or simply as sensing operations). The sensing operations may allow device 10 to detect (e.g., sense or identify) the presence, location, orientation, and/or velocity (motion) of objects external to device 10. Detecting, sensing, or identifying the presence, location, orientation, and/or velocity (motion) of an external object at any given time or over a given time period may sometimes be referred to herein simply as detecting the external object. The sensing operations may be performed over a relatively short range such as ranges of a few cm from antennas 30 (e.g., using voltage standing wave ratio detector(s) coupled to antennas 30) or over longer ranges such as ranges of dozens of cm, a few meters, dozens of meters, etc.

Control circuitry 14 may use the detected presence, location, orientation, and/or velocity of the external objects to perform any desired device operations. As examples, control circuitry 14 may use the detected presence, location, orientation, and/or velocity of the external objects to identify a corresponding user input for one or more software applications running on device 10 such as a gesture input performed by the user's hand(s) or other body parts or performed by an external stylus, gaming controller, head-mounted device, or other peripheral devices or accessories, to determine when one or more antennas 30 needs to be disabled or provided with a reduced maximum transmit power level (e.g., for satisfying regulatory limits on radio-frequency exposure), to determine how to steer a radio-frequency signal beam produced by antennas 30 for communications circuitry 26 (e.g., in scenarios where antennas 30 include a phased array of antennas 30), to map or model the environment around device 10 (e.g., to produce a software model of the room where device 10 is located for use by an augmented reality application, gaming application, map application, home design application, engineering application, etc.), to detect the presence of obstacles in the vicinity of (e.g., around) device 10 or in the direction of motion of the user of device 10, etc.

Wireless circuitry 24 may include sensing circuitry 28 for performing sensing operations using antennas 30. Sensing circuitry 28 may include a sensing transmitter (e.g., transmitter circuitry including signal generators, synthesizers, etc.), a sensing receiver, mixer circuitry, amplifier circuitry, filter circuitry, baseband circuitry, ADC circuitry, DAC circuitry, and/or any other desired components used in performing sensing operations using antennas 30. Sensing circuitry 28 may perform the sensing operations using radio-frequency sensing signals that are transmitted by antennas 30 and using reflected versions of the radio-frequency sensing signals that have reflected off external objects around device 10. Antennas 30 may include separate antennas for conveying wireless communications data for communications circuitry 26 and for conveying sensing signals or may include one or more antennas 30 that are used to both convey wireless communications data and to perform sensing operations. Using a single antenna 30 to both convey wireless communications data and perform sensing operations may, for example, serve to minimize the amount of space occupied in device 10 by antennas 30.

Sensing circuitry 28 and communications circuitry 26 may be coupled to antennas 30 over radio-frequency transmission line paths 32. If desired, sensing circuitry 28 may perform sensing operations and communications circuitry 26 may perform wireless communications using radio-frequency signals of different polarizations (e.g., a linear horizontal polarization, a linear vertical polarization, a circular polarization, an elliptical polarization, etc.). Radio-frequency transmission line paths 32 may include a first set of radio-frequency transmission line paths 32V for conveying radio-frequency signals for sensing circuitry 28 and communications circuitry 26 with a first polarization (e.g., a vertical (V) polarization) and may include a second set of radio-frequency transmission line paths 32H for conveying radio-frequency signals for sensing circuitry 28 and communications circuitry 26 with a second polarization that is different from the first polarization (e.g., a horizontal (H) polarization).

Radio-frequency transmission lines 32H and 32V may include coaxial cables, microstrip transmission lines, stripline transmission lines, edge-coupled microstrip transmission lines, edge-coupled stripline transmission lines, transmission lines formed from combinations of transmission lines of these types, etc. Radio-frequency transmission lines 32H and 32V may be integrated into rigid and/or flexible printed circuit boards if desired. The example of FIG. 1 in which different radio-frequency transmission lines 32V and 32H are coupled to sensing circuitry 28 and communications circuitry 26 is merely illustrative. If desired, one or more radio-frequency lines 32V may be shared by both sensing circuitry 28 and communications circuitry 26 (e.g., for coupling both sensing circuitry 28 and communications circuitry 26 to the same antenna feed on the same antenna 30). Similarly, one or more radio-frequency lines 32H may be shared by both sensing circuitry 28 and communications circuitry 26. Radio-frequency front end (RFFE) modules may be interposed on one or more radio-frequency transmission lines 32H and/or 32V. The radio-frequency front end modules may include substrates, integrated circuits, chips, or packages that are separate from sensing circuitry 28 and communications circuitry 26 and may include filter circuitry, switching circuitry, amplifier circuitry, impedance matching circuitry, radio-frequency coupler circuitry, and/or any other desired radio-frequency circuitry for operating on the radio-frequency signals conveyed over radio-frequency transmission lines 32H and/or 32V.

The example of FIG. 1 is merely illustrative. While control circuitry 14 is shown separately from wireless circuitry 24 in the example of FIG. 1 for the sake of clarity, wireless circuitry 24 may include processing circuitry (e.g., one or more processors) that forms a part of processing circuitry 18 and/or storage circuitry that forms a part of storage circuitry 16 of control circuitry 14 (e.g., portions of control circuitry 14 may be implemented on wireless circuitry 24). As an example, control circuitry 14 may include baseband circuitry (e.g., one or more baseband processors), digital control circuitry, analog control circuitry, and/or other control circuitry that forms part of communications circuitry 26 and/or sensing circuitry 28. The baseband circuitry may, for example, access a communication protocol stack on control circuitry 14 (e.g., storage circuitry 20)

to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer. If desired, the PHY layer operations may additionally or alternatively be performed by radio-frequency (RF) interface circuitry in wireless circuitry 24.

Figure 2:
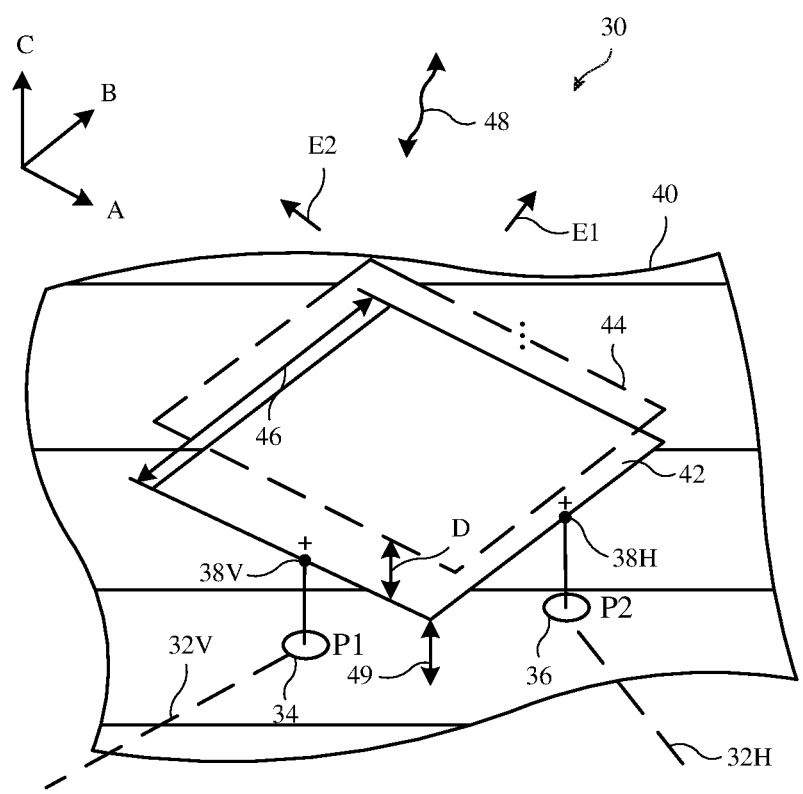
FIG. 2 is a perspective view of an illustrative antenna that may convey radio-frequency signals using horizontal and vertical polarizations in accordance with some embodiments.

Any desired antenna structures may be used to form antennas 30. If desired, antennas 30 may each have multiple antenna feeds that allow the antennas to support multiple polarizations. Each antenna 30 may, for example, have a first antenna feed coupled to a corresponding radio-frequency transmission line 32V for handling a first polarization and a second antenna feed coupled to a corresponding radio-frequency transmission line 32H for handling a second polarization. FIG. 2 is a perspective view showing one example in which an antenna 30 is formed using patch antenna structures for covering multiple polarizations.

As shown in FIG. 2, antenna 30 may have a patch antenna resonating element 42 that is separated from and parallel to a ground plane such as antenna ground 40. Patch antenna resonating element 42 may lie within a plane such as the A-B plane of FIG. 2 (e.g., the lateral surface area of element 42 may lie in the A-B plane). Patch antenna resonating element 42 may sometimes be referred to herein as patch 42, patch element 42, patch resonating element 42, antenna resonating element 42, or resonating element 42. Antenna ground 40 may lie within a plane that is parallel to the plane of patch element 42. Patch element 42 and antenna ground 40 may therefore lie in separate parallel planes that are separated by distance 49. Patch element 42 and antenna ground 40 may be formed from conductive traces patterned on a dielectric substrate such as a rigid or flexible printed circuit board substrate or any other desired conductive structures.

The length of the sides of patch element 42 may be selected so that antenna 30 resonates (radiates) at a desired operating frequency. For example, the sides of patch element 42 may each have a length 46 that is approximately equal to half of the wavelength of the signals conveyed by antenna 30 (e.g., the effective wavelength given the dielectric properties of the materials surrounding patch element 42). In one suitable arrangement, length 46 may be between 0.8 mm and 1.2 mm (e.g., approximately 1.1 mm) for covering a millimeter wave frequency band between 57 GHz and 70 GHz or between 1.6 mm and 2.2 mm (e.g., approximately 1.85 mm) for covering a millimeter wave frequency band between 37 GHz and 41 GHz, as just two examples.

The example of FIG. 2 is merely illustrative. Patch element 42 may have a square shape in which all of the sides of patch element 42 are the same length or may have a different rectangular shape. Patch element 42 may be formed in other shapes having any desired number of straight and/or curved edges.

To enhance the polarizations handled by antenna 30, antenna 30 may be provided with multiple antenna feeds. As shown in FIG. 2, antenna 30 may have a first antenna feed at antenna port P1 that is coupled to a corresponding radio-frequency transmission line path 32V. Antenna 30 may have a second antenna feed at antenna port P2 that is coupled to a corresponding radio-frequency transmission line path 32H. The first antenna feed may have a first ground feed terminal coupled to antenna ground 40 (not shown in FIG. 2 for the sake of clarity) and a first positive antenna feed terminal 38V coupled to patch element 42. The second antenna feed may have a second ground feed terminal coupled to antenna ground 40 (not shown in FIG. 2 for the sake of clarity) and a second positive antenna feed terminal 38H on patch element 42.

Holes or openings such as openings 34 and 36 may be formed in antenna ground 40. Radio-frequency transmission line path 32V may include a vertical conductor (e.g., a conductive through-via, conductive pin, metal pillar, solder bump, combinations of these, and/or other vertical conductive interconnect structures) that extends through opening 34 to positive antenna feed terminal 38V on patch element 42. Radio-frequency transmission line path 32H may include a vertical conductor that extends through opening 36 to positive antenna feed terminal 38H on patch element 42. This example is merely illustrative and, if desired, other transmission line structures may be used (e.g., coaxial cable structures, stripline transmission line structures, etc.).

When using the first antenna feed associated with port P1, antenna 30 may transmit and/or receive radio-frequency signals having a first polarization (e.g., the electric field E1 of radio-frequency signals 48 associated with port P1 may be oriented parallel to the B-axis in FIG. 2). When using the antenna feed associated with port P2, antenna 30 may transmit and/or receive radio-frequency signals having a second polarization (e.g., the electric field E2 of radio-frequency signals 48 associated with port P2 may be oriented parallel to the A-axis of FIG. 2 so that the polarizations associated with ports P1 and P2 are orthogonal to each other).

One of ports P1 and P2 may be used at a given time so that antenna 30 operates as a single-polarization antenna or both ports may be operated at the same time so antenna 30 operates as a dual-polarization antenna (e.g., where antenna 30 concurrently conveys horizontal and vertically polarized signals) or with other polarizations (e.g., as a circularly-polarized antenna, an elliptically-polarized antenna, etc.).

If desired, antenna 30 may include one or more additional patch elements 44 that are stacked over patch element 42. Each patch element 44 may partially or completely overlap patch element 42. The lower-most patch element 44 may be separated from patch element 42 by distance D, which is selected to provide antenna 30 with a desired bandwidth without occupying excessive volume within device 10. Patch elements 44 may have sides with lengths other than length 46, which configure patch elements 44 to radiate at different frequencies than patch element 42, thereby extending the overall bandwidth of antenna 30. Patch elements 44 may include directly-fed patch antenna resonating elements (e.g., patch elements with one or more positive antenna feed terminals directly coupled to transmission lines) and/or parasitic antenna resonating elements that are not directly fed by antenna feed terminals and transmission lines. One or more patch elements 44 may be coupled to patch element 42 by one or more conductive through vias if desired (e.g., so that at least one patch element 44 and patch element 42 are coupled together as a single directly fed resonating element). In scenarios where patch elements 44 are directly fed, patch elements 44 may include two positive antenna feed terminals for conveying signals with different (e.g., orthogonal) polarizations and/or may include a single positive antenna feed terminal for conveying signals with a single polarization. The combined resonance of patch element 42 and each of patch elements 44 may configure antenna 30 to radiate with satisfactory antenna efficiency across the entirety of any desired frequency band.

The example of FIG. 2 is merely illustrative. Patch elements 44 may be omitted if desired. Patch elements 44 may be rectangular, square, cross-shaped, or any other desired shape having any desired number of straight and/or curved edges. Patch elements 44 may be provided at any desired orientation relative to patch element 42. Antenna 30 may have any desired number of feeds. Other antenna types may be used if desired (e.g., dipole antennas, monopole antennas, slot antennas, inverted-F antennas, planar inverted-F antennas, waveguide antennas, dielectric resonator antennas, etc.).

In some scenarios, communications circuitry 26 and sensing circuitry 28 use antennas 30 in a time-interleaved manner (e.g., where communications circuitry 26 performs wireless communications using antennas 30 while sensing circuitry 28 is inactive and sensing circuitry 28 performs sensing operations using antennas 30 while communications circuitry 26 is inactive). Time-division duplexing wireless communications and sensing operations may prevent interference between the wireless communications and the sensing operations but can consume an excessive amount of time. Performing wireless communications using antennas 30 concurrently with performing sensing operations using antennas 30 may maximize the time efficiency of wireless circuitry 24 but, if care is not taken, there can be coexistence challenges where the sensing operations undesirably interfere with wireless communications or vice versa. For example, the radio-frequency signals transmitted by sensing circuitry 28 can couple onto one or more receivers in communications circuitry 26 to disturb signal reception by the receivers. Similarly, the relatively high output power level of transmitters in communications circuitry 26 can adversely affect a receiver in sensing circuitry 28.

Figure 3:
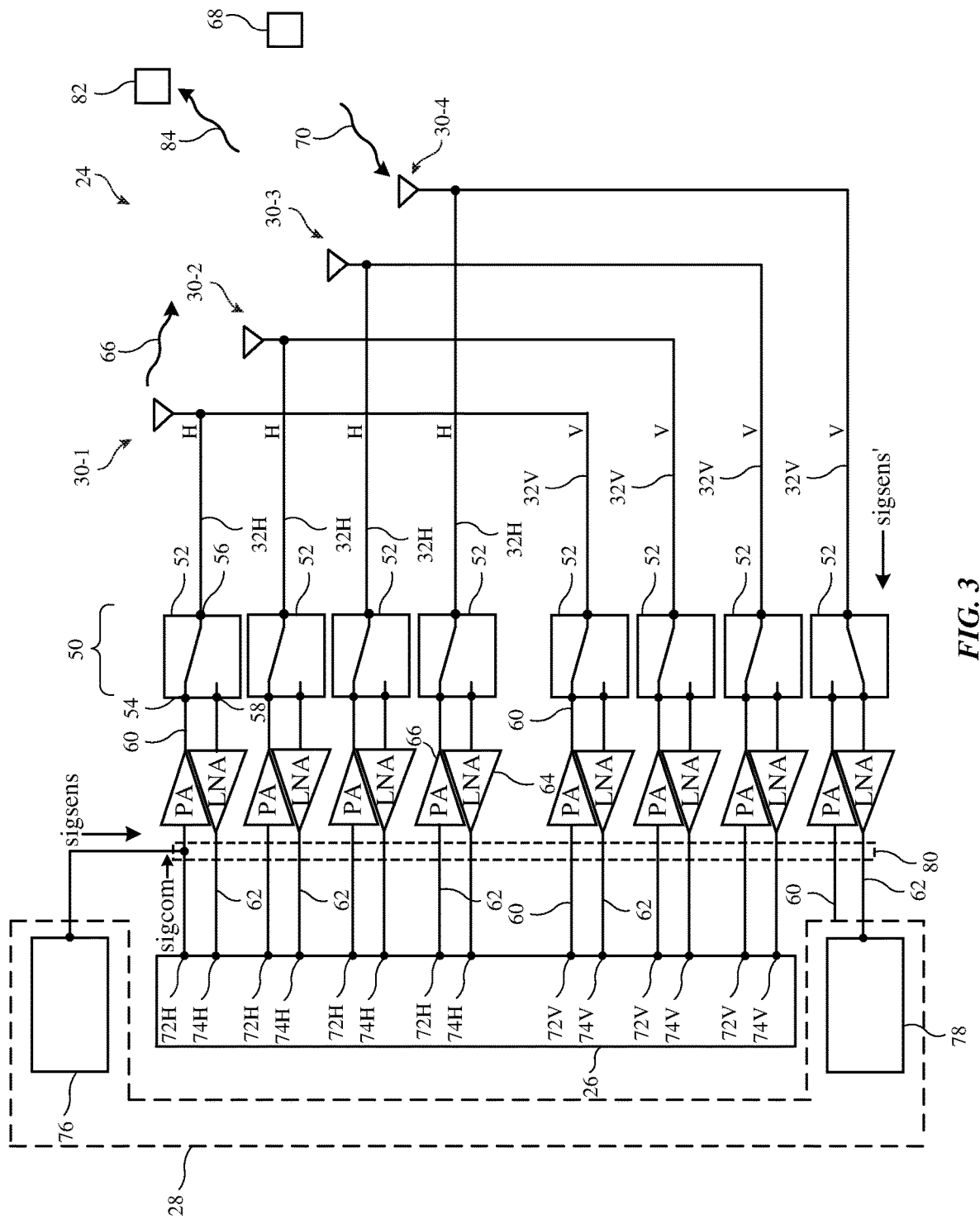
FIG. 3 is a circuit block diagram showing how illustrative communications circuitry may perform wireless communications using a set of antennas and multiple polarizations while illustrative sensing circuitry concurrently performs sensing operations using the antennas in accordance with some embodiments.

In order to mitigate these issues, wireless circuitry 24 may leverage the multiple polarizations covered by antennas 30 to perform concurrent wireless communications and sensing operations with minimal interference between the wireless communications and sensing operations. FIG. 3 is a circuit block diagram showing one example of how communications circuitry 26 and sensing circuitry 28 may concurrently use antennas 30. In the example of FIG. 3, there is a set of N=4 antennas 30 (e.g., a first antenna 30-1, a second antenna 30-2, a third antenna 30-3, and a fourth antenna 30-4) that are used to perform wireless communications. This example is merely illustrative and, in general, N be any number greater than or equal to two.

As shown in FIG. 3, each antenna 30 may be coupled to a respective radio-frequency transmission line path 32V and to a respective radio-frequency transmission line path 32H. Switching circuitry such as switching circuitry 50 may be communicably coupled between radio-frequency transmission line paths 34H/32V and communications circuitry 26. Switching circuitry 50 may include switches 52 (e.g., single-pole double-throw (SPDT) switches). Each switch 52 may have a first terminal 56 coupled to a corresponding radio-frequency transmission line path 32H or 32V. Each switch 52 may have a respective second terminal 54 coupled to a corresponding transmit port 72 of communications circuitry 26 over a respective transmit chain 60 (sometimes referred to herein as transmit path 60). Each switch 52 may also have a respective third terminal 56 coupled to a corresponding receive port 74 of communications circuitry 26 over a respective receive chain 62 (sometimes referred to herein as receive path 62). One or more power amplifiers such as power amplifier (PA) 66 may be interposed on each transmit chain 60. One or more low-noise amplifiers such as low-noise amplifier (LNA) 64 may be interposed on each receive chain 62.

Transmit ports 72 may include first transmit ports 72V that transmit radio-frequency signals for a first polarization (e.g., V polarization) and may include second transmit ports 72H that transmit radio-frequency signals for a second polarization (e.g., H polarization). Transmit ports 72H may therefore sometimes be referred to herein as horizontal-polarization transmit ports 72H and transmit ports 72V may therefore sometimes be referred to herein as vertical-polarization transmit ports 72V. Similarly, receive ports 74 may include first receive ports 74V that receive radio-frequency signals of the first polarization (e.g., V polarization) and may include second receive ports 74H that receive radio-frequency signals of the second polarization (e.g., H polarization). Receive ports 74H may therefore sometimes be referred to herein as horizontal-polarization receive ports 74H and receive ports 74V may therefore sometimes be referred to herein as vertical-polarization receive ports 74V.

Transmit ports 72H may be located on respective transmitters, transceivers, radios, or integrated circuit chips in communications circuitry 26 or two or more transmit ports 72H may be located on the same transmitter, transceiver, radio, or integrated circuit chip in communications circuitry 26. Transmit ports 72V may be located on respective transmitters, transceivers, radios, or integrated circuit chips in communications circuitry 26 or two or more transmit ports 72V may be located on the same transmitter, transceiver, radio, or integrated circuit chip in communications circuitry 26. Similarly, receive ports 74H may be located on respective receivers, transceivers, radios, or integrated circuit chips in communications circuitry 26 or two or more receive ports 74H may be located on the same receiver, transceiver, radio, or integrated circuit chip in communications circuitry 26. Receive ports 74V may be located on respective receivers, transceivers, radios, or integrated circuit chips in communications circuitry 26 or two or more receive ports 74V may be located on the same receiver, transceiver, radio, or integrated circuit chip in communications circuitry 26. Transmit ports 72H/72V and receive ports 74H/74V may be located on different transceivers, radios, or integrated circuit chips or a single transceiver, radio, or integrated circuit chip may include one or more transmit ports 72H, one or more transmit ports 72V, one or more receive ports 74V, and/or one or more receive ports 74H.

Each switch 52 may have a first state in which switch 52 couples terminal 56 to terminal 54 to couple the corresponding antenna 30 to the corresponding transmit port 72 on communications circuitry 26. While switch 52 is in the first state, the power amplifier 64 coupled to the switch may receive radio-frequency signals sigcom from the corresponding transmit port 72 and may amplify the radio-frequency signals, which are then forwarded to the corresponding antenna 30 by switch 52 for transmission (e.g., as radio-frequency signals 84). Each switch 52 may also have a second state in which switch 52 couples terminal 56 to terminal 58 to couple the corresponding antenna 30 to the corresponding receive terminal 74 on communications circuitry 26. While switch 52 is in the second state, switch 52 may forward radio-frequency signals received by the corresponding antenna 30 to the corresponding receive port 74. Radio-frequency signals sigcom may be transmitted (e.g., in radio-frequency signals 84) to external communications equipment such as external communications equipment 82 (e.g., another device such as device 10, a wireless access point, a wireless base station, etc.). Control circuitry 14 (FIG. 1) may provide control signals that toggle switches 52 to couple the horizontally-polarized antenna feed for each antenna 30 to a given transmit port 72H or receive port 74H (e.g., for transmitting horizontally-polarized signals or receiving horizontally-polarized signals) or to couple the vertically-polarized antenna feed for each antenna 30 to a given transmit port 72V or receive port 74V (e.g., for transmitting vertically-polarized signals or receiving vertically polarized signals).

Sensing circuitry 28 may include at least one sensing transmitter 76 and at least one sensing receiver 78. In the example of FIG. 3, sensing transmitter 76 is coupled to the transmit chain 60 for the horizontally-polarized antenna feed for antenna 30-1 and sensing receiver 78 is coupled to the receive chain 62 for the vertically-polarized antenna feed for antenna 30-4. This example is merely illustrative and, in general, sensing transmitter 76 may be coupled to either the horizontally-polarized transmit chain or the vertically-polarized transmit chain for any of antennas 30-1 through 30-4. Similarly, sensing receiver 78 may be coupled to either the horizontally-polarized receive chain or the vertically-polarized receive chain for any of antennas 30-1 through 30-4. If desired, wireless circuitry 24 may include an additional stage of switching circuitry such as switching circuitry 80. Switching circuitry 80 may be interposed on transmit chains 60 and receive chains 62. Control circuitry 14 (FIG. 1) may control switching circuitry 80 to selectively couple sensing transmitter 76 to any of the transmit chains in wireless circuitry 24 and to selectively couple sensing receiver 78 to any of the receive chains in wireless circuitry 24 at any given time. In other words, control circuitry 14 may use switching circuitry 80 to adjust/change which antennas 30 and which polarizations are used for performing sensing operations over time.

As shown in FIG. 3, sensing transmitter 76 may transmit radio-frequency signals such as sensing signals sigsens over the horizontal polarization transmit chain 60 coupled to antenna 30-1. Sensing signals sigsens may include chirp signals, as an example (e.g., in implementations where sensing circuitry 28 has a frequency-modulated continuous-wave (FMCW) architecture). If desired, sensing signals sigsens may also be routed from transmit chain 60 to a de-chirp mixer in sensing receiver 78. Sensing signals sigsens may include continuous waves of radio-frequency energy, wideband signals, one or more signal tones, or any other desired transmit signals, as other examples. The switch 52 coupled to sensing transmitter 76 may route sensing signals sigsens to antenna 30-1 over the corresponding radio-frequency transmission line path 32H. Antenna 30-1 may radiate sensing signals sigsens as radio-frequency signals 66. Unlike radio-frequency signals 84, radio-frequency signals 66 may be free from wireless communications data (e.g., cellular communications data packets, WLAN communications data packets, etc.). Sensing transmitter 76 may transmit sensing signals sigsens at one or more carrier frequencies in any desired frequency band(s) (e.g., frequency band that includes frequencies greater than around 10 GHz, greater than around 20 GHz, less than 10 GHz, 20-30 GHz, greater than 40 GHz, 20-60 GHz, less than 1 GHz, etc.).

Radio-frequency signals 66 may reflect off of objects external to device 10, such as external object 68, as reflected signals 70. External object 68 may be, for example, the ground, a building, part of a building, a wall, furniture, a ceiling, a person, a body part (e.g., the head, hand, or other body part of the user of device 10 or other humans in the vicinity of device 10), an animal, a vehicle, a landscape or geographic feature, an obstacle, external communications equipment such as external wireless communications equipment 82, another device of the same type as device 10 or a peripheral device such as a gaming controller, stylus, or remote control, or any other physical object or entity that is external to device 10.

In the example of FIG. 3, antenna 30-4 may be used to receive reflected signals 70 (e.g., a reflected version of radio-frequency signals 66 that have reflected off of external object 68). Antenna 30-4 may pass reflected signals 70 to the switch 52 coupled to the receive chain 62 that is coupled to sensing receiver 78 (e.g., as reflected sensing signals sigsens'). Reflected sensing signals sigsens' may include sensing signals sigsens (e.g., chirp signals) that have reflected off of external object 68 and that have been received by antenna 30-4. The switch and the receive path may pass reflected sensing signals sigsens' to sensing receiver 78 for processing. Sensing circuitry 28 may process the transmitted sensing signals sigsens and the reflected sensing signals sigsens' to identify (e.g., generate, estimate, determine, compute, calculate, deduce, etc.) the position, location, presence, orientation, and/or velocity of external object 68.

As shown in FIG. 3, switching circuitry 50 and/or 80 may configure each of antennas 30-1, 30-2, 30-3, and 30-4 to transmit horizontally-polarized radio-frequency signals 66 (e.g., horizontally-polarized radio-frequency signals sigcom) for communications circuitry 26. The switching circuitry may configure antennas and 30-1, 30-2, and 30-3 to concurrently transmit vertically-polarized radio-frequency signals 66 (e.g., vertically-polarized radio-frequency signals sigcom) for communications circuitry 26. The switching circuitry may configure antenna 30-1 to concurrently transmit horizontally-polarized radio-frequency signals 84 (e.g., horizontally-polarized sensing signals sigsens) for sensing circuitry 28. The switching circuitry may configure antenna 30-4 to concurrently receive vertically-polarized reflected signals 70 (e.g., vertically-polarized reflected sensing signals sigsens'). In other words, wireless circuitry 24 may concurrently transmit sensing signals sigsens and radio-frequency signals sigcom using the horizontal polarization of one of the N antennas 30 (e.g., antenna 30-1) and may sacrifice one of the polarizations of the N antennas 30 (e.g., the vertical polarization of antenna 30-4) to receive reflected signals 70 for use in performing sensing operations (e.g., while the other antennas 30 are used to transmit radio-frequency signals 84 with both polarizations for communications circuitry 26). This may allow sensing operations to be performed with a minimal impact on the throughput of communications circuitry 26, for example.

The example of FIG. 3 is merely illustrative. There may be more than four antennas 30 or fewer than four antennas 30 coupled to communications circuitry 26 and sensing circuitry 28 (e.g., only a pair of antennas such as antennas 30-1 and 30-4). Either polarization of any of the antennas may be used to provide reflected sensing signals sigsens' to sensing receiver 78. Either polarization of any of the antennas may be used to transmit sensing signals sigsens. In some implementations, antenna 30-1 may transmit sensing signals sigsens with a first polarization (e.g., with an H polarization in horizontally-polarized radio-frequency signals 66) while transmitting radio-frequency signals sigcom with the first polarization (e.g., with an H polarization in radio-frequency signals 84) and with the second polarization (e.g., with a V polarization in radio-frequency signals 84) (e.g., as shown in FIG. 3), while antenna 30-4 transmits radio-frequency signals sigcom with the second polarization (e.g., with a V polarization in radio-frequency signals 84) and while antenna 30-4 receives reflected sensing signals sigsens' with the first polarization (e.g., with an H polarization in reflected signals 70). In other words, the polarization arrangement of antenna 30-4 as shown in FIG. 3 may be reversed if desired. The first and second polarizations handled by antennas 30 need not be limited to vertical and horizontal polarizations and may, in general, include any desired polarizations. Other switching architectures, transmit chain architectures, and/or receive chain architectures may be used if desired. Antennas 30-1 through 30-4 may, if desired, form a phased antenna array that transmits radio-frequency signals 84 within a steerable signal beam (e.g., a signal beam that is adjusted to point towards external communications equipment 82). In these scenarios, phase and magnitude controllers may be interposed on the transmit chains 60 to perform beam steering for radio-frequency signals 84.

Figure 4:
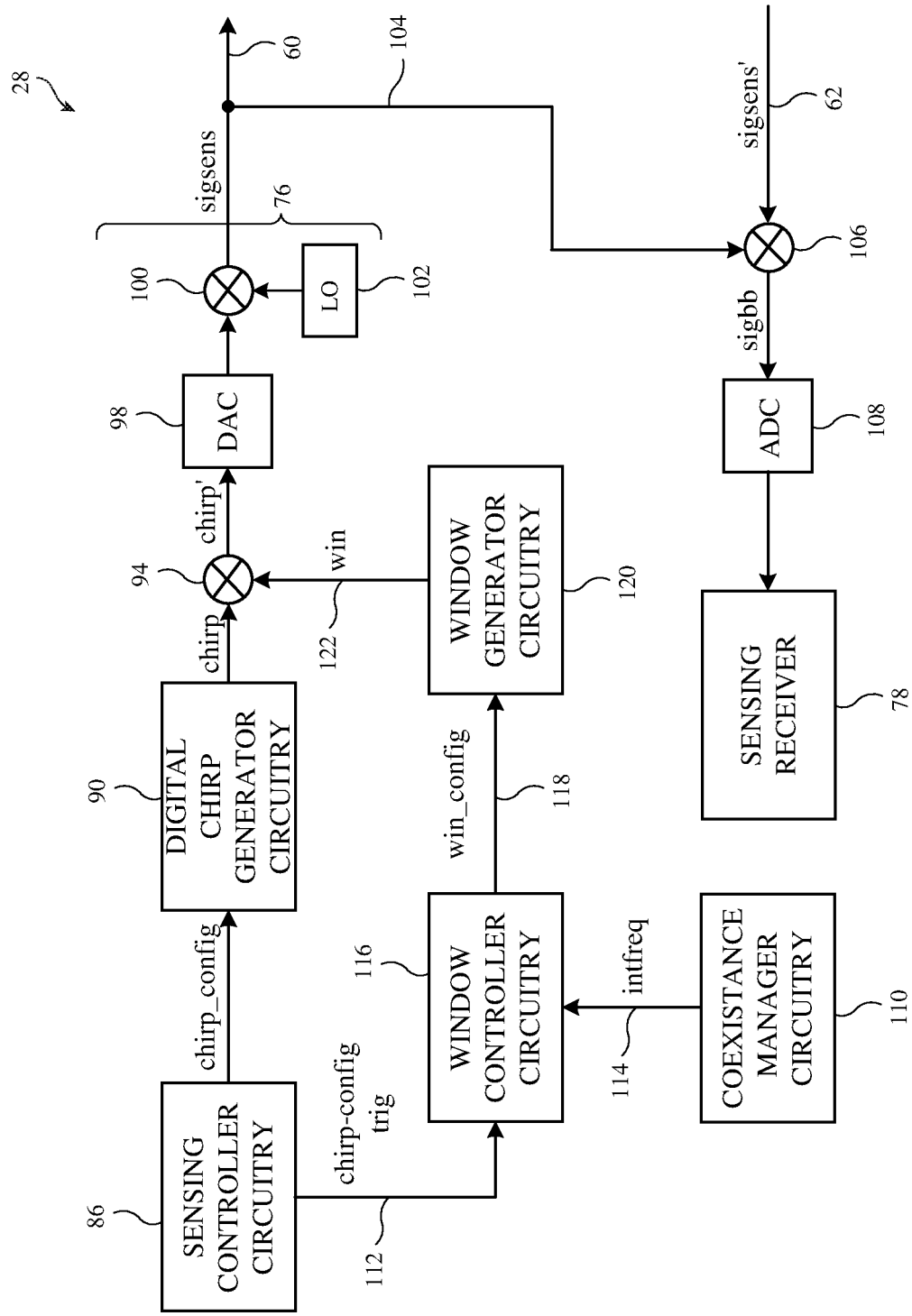
FIG. 4 is a circuit block diagram of illustrative sensing circuitry that performs sensing operations without interfering with concurrent wireless communications in accordance with some embodiments.

Sensing circuitry 28 may include circuitry to prevent interference between the sensing signals sigsens transmitted by sensing transmitter 76 and the radio-frequency signals sigcom transmitted by communications circuitry 26 (e.g., because sensing transmitter 76 transmits sensing signals sigsens concurrently with the transmission of radio-frequency signals sigcom by communications circuitry 26). FIG. 4 is a circuit block diagram showing how sensing circuitry 28 may include circuitry to prevent interference between sensing signals sigsens and radio-frequency signals sigcom.

As shown in FIG. 4, sensing circuitry 28 may include window controller circuitry 116, window generator circuitry 120, and coexistence manager circuitry 110. Sensing transmitter 76 in sensing circuitry 28 may include sensing controller circuitry 86, digital chirp generator circuitry 90, multiplier 94, DAC 98, upconversion circuitry such as mixer 100, and clocking circuitry such as local oscillator (LO) 102. Window controller circuitry 116 may sometimes be referred to herein as window controller 116 or window control engine 116. Window generator circuitry 120 may sometimes be referred to herein as window generator 120 or window generation engine 120. Sensing controller circuitry 86 may sometimes be referred to herein as sensing controller 86 or sensing control engine 86. Digital chirp generator circuitry 90 may sometimes be referred to herein as digital chirp generator 90 or digital chirp generation engine 90. Coexistence manager circuitry 110 may sometimes be referred to herein as coexistence manager 110 or coexistence management engine 110. Sensing controller circuitry 86, digital chirp generator circuitry 90, multiplier 94, window controller circuitry 116, window generator circuitry 120, and coexistence manager circuitry 110 may be implemented in software (e.g., running on storage circuitry and executed by one or more processors) and/or in hardware (e.g., using one or more digital logic gates, circuit components, diodes, transistors, switches, arithmetic logic units (ALUs), registers, application-specific integrated circuits, field-programmable gate arrays, one or more processors, look-up tables, etc.). Some or all of these components may form part of control circuitry 14 of FIG. 1, if desired.

Sensing controller 86 may have outputs coupled to the input of digital chirp generator 90 over control path 88 and coupled to an input of window controller 116 over control path 112. Coexistence manager 110 may have an output coupled to an input of window controller 116 over control path 114. If desired, coexistence manager 110 may also have an input coupled to communications circuitry 26 (not shown). Window controller 116 may have an output coupled to window generator 120 over control path 118. Window generator 120 may have an output coupled to a first input of multiplier 94 over control path 122. Digital chirp generator 90 may have an output coupled to a second input of multiplier 94. Multiplier 94 may have an output coupled to DAC 98. DAC 98 may have an output coupled to a first input of mixer 100. Mixer 100 may have a second input coupled to LO 102 and may have an output coupled to transmit chain 60. Switching circuitry 80 of FIG. 3 may communicably couple transmit chain 60 to the horizontal antenna feed of antenna 30-1 or to any other desired antenna feed of any of the antennas 30 in device 10.

As shown in FIG. 4, sensing circuitry 28 may also include ADC 108 and mixer 106. Mixer 106 may have a first input coupled to receive chain 62. Switching circuitry 80 of FIG. 3 may communicably couple receive chain 62 to the vertical antenna feed of antenna 30-4 or to any other desired antenna feed of any of the antennas 30 in device 10. Mixer 106 may have a second input coupled to transmit chain 60 over de-chirp path 104. Mixer 106 may sometimes also be referred to herein as de-chirp mixer 106. De-chirp mixer 106 may have an output coupled to the input of ADC 108. ADC 108 may have an output coupled to sensing receiver 78. The example of FIG. 4 is merely illustrative. De-chirp mixer 106 may be interposed between the output of ADC 108 and sensing receiver 78 and de-chirp path 104 may be coupled to the output of multiplier 94 if desired. Other sensing circuitry architectures may be used if desired.

When sensing circuitry 28 performs sensing operations, sensing controller 86 may generate chirp configuration control signal chirp_config and trigger signal trig. Sensing controller 86 may provide chirp configuration control signal chirp_config to digital chirp generator 90 over control path 88. Digital chirp generator 90 may generate chirp signals chirp based on chirp configuration control signal chirp_config. The chirp signals have a frequency that periodically ramps up over time (e.g., where the chirp signals are sawtooth signals in frequency as a function of time). Chirp configuration control signal chirp_config may, for example, identify a slope (e.g., in frequency as a function of time) for the chirp signals and a duration for each frequency ramp (e.g., each chirp) in the chirp signals. Digital chirp generator 90 may provide the chirp signals to the second input of multiplier 94. Sensing controller 86 may also provide chirp configuration control signal chirp_config and trigger signal trig to window controller 116 over control path 112.

Coexistence manager 110 may identify interference frequencies INF at which sensing signals sigsens will interfere with the radio-frequency signals transmitted and/or received by communications circuitry 26. Coexistence manager 110 may, for example, receive control information from communications circuitry 26 that identifies the frequencies used by communications circuitry 26. Coexistence manager 110 may identify interference frequencies INF based on the control information received from communications circuitry 26. Coexistence manager 110 may generate a control signal intfreq that identifies the interference frequencies INF. Coexistence manager 110 may pass control signal intfreq to window controller 116 over control path 114.

Window controller 116 may generate (e.g., identify, produce, compute, calculate, estimate, deduce, etc.) window timing for muting certain frequencies of the chirp signals generated by digital chirp generator 90. Window controller 116 may generate the window timing based on the interference frequencies INF identified by control signal intfreq, the chirp configuration control signal chirp_config, and/or trigger signal trig. For example, window controller 116 may identify time periods of the chirp signals generated by digital chirp generator 90 that need to be muted for the chirp signals to have zero magnitude at interference frequencies INF. Window controller 116 may generate window configuration control signal win_config that identifies the generated window timing and may pass window configuration control signal win_config to window generator 120 over control path 118. Window controller 116 may also pass trigger signal trig to window generator 120 over control path 118.

Window generator 120 may generate window signal win (sometimes referred to herein as windowing signal win, windowing function win, muting signal win, or muting function win) based on the window timing identified by window configuration control signal win_config and based on trigger signal trig. Window signal win may, for example, be a circular time window or digital square wave having an amplitude of logic "0" during the time periods where the chirp signals need to be muted (e.g., to have zero magnitude at interference frequencies INF) and having an amplitude of logic "1" between the time periods. Window controller 116 and window generator 120 may use trigger signal trig to synchronize window signal win with the chirp signals produced by digital chirp generator 90. Window controller 120 may pass window signal win to the first input of multiplier 94 over control path 122.

Multiplier 94 may multiply chirp signals chirp (e.g., un-muted chirp signals) with window signal win to generate (e.g., produce, output, calculate, compute, etc.) muted chirp signals chirp'. Multiplier 94 may pass muted chirp signals chirp' to DAC 98. Muted chirp signals chirp' may sometimes also be referred to herein as windowed chirp signals chirp'. DAC 98 may convert muted chirp signals chirp' from the digital domain to the analog domain. Mixer 100 may upconvert the analog muted chirp signals (e.g., using LO 102) to radio frequencies (as sensing signals sigsens). Sensing circuitry 28 may transmit sensing signals sigsens over transmit chain 60. A signal splitter or coupler may also couple some of sensing signals sigsens off of transmit chain 60 and may route sensing signals sigsens to the second input of de-chirp mixer 106 in sensing circuitry 28. If desired, an amplifier (not shown) may be interposed on de-chirp path 104 to boost the amplitude of the sensing signals provided to de-chirp mixer 106. De-chirp mixer 106 may receive reflected sensing signals sigsens' at its first input (e.g., from receive chain 62). De-chirp mixer 106 may mix sensing signals sigsens with reflected sensing signals sigsens' to produce (e.g., generate) baseband signals sigbb. ADC 108 may convert baseband signals sigbb to the digital domain. Sensing receiver 78 may receive baseband signals sigbb. Sensing circuitry 28 may process the baseband signals sigbb received by sensing receiver 78 and the sensing signals sigsens transmitted by sensing transmitter 76 to identify the presence, location, orientation, and/or velocity of external object 68 (FIG. 3). For example, doppler shifts may be detected and processed to identify the velocity of external object 68, the time dependent frequency difference between radio-frequency signals 66 and reflected signals 70 (FIG. 3) may be detected and processed to identify the range between device 10 and external object 68, etc. Use of continuous wave signals for performing sensing operations may allow sensing circuitry 28 to reliably distinguish between external object 68 and other background or slower-moving objects, for example.

The time periods where window signal win has zero magnitude may cause multiplier 94 to provide muted chirp signals chirp' with zero amplitude (e.g., without changing the amplitude of the chirp signals when window signal has a magnitude of 1). The zero amplitude during these time periods may cause muted chirp signals chirp' to have zero amplitude at the interference frequencies INF used by communications circuitry 26 for transmitting and/or receiving radio-frequency signals. In other words, muted chirp signals chrip' may be the same as chirp signals chirp but while skipping the frequencies occupied by communications circuitry 26. This may prevent interference between the muted chirp signals and the radio-frequency signals handled by communications circuitry 26. For example, when sensing circuitry 28 is the victim, this may prevent the baseband receiver from saturating, because the interference is filtered by the de-chirp operation. When sensing circuitry 28 is the aggressor, there is no chirp signal transmitted over-the-air at frequencies that would interfere with the operation of communications circuitry 26. The example of FIG. 4 in which sensing circuitry 28 uses an FMCW architecture is merely illustrative and in general, sensing circuitry 28 may use other object sensing architectures.

Figure 5:
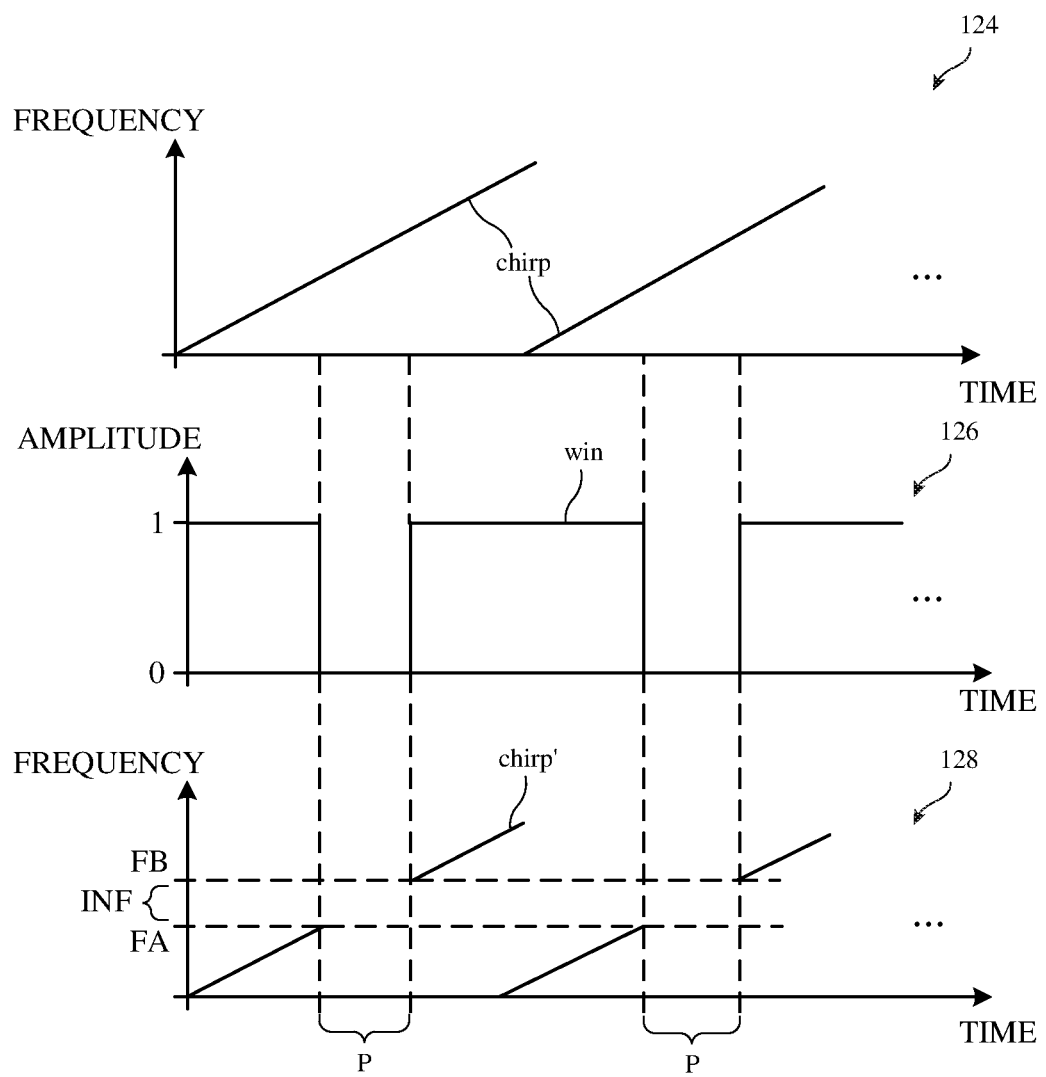
FIG. 5 includes plots showing how illustrative sensing circuitry may generate muted chirp signals for performing sensing operations without interfering with concurrent wireless communications in accordance with some embodiments.

FIG. 5 is a plot showing how sensing circuitry 28 may generate muted chirp signals chrip'. Plot 124 of FIG. 5 illustrates exemplary chirp signals chirp as produced by digital chirp generator 90. As shown by plot 124, the chirp signals include a periodic ramp up in frequency (e.g., where the slope and duration of each ramp is determined based on chirp configuration control signal chirp_config).

Plot 126 of FIG. 5 illustrates exemplary window signals win as produced by window generator 120. As shown by plot 126, the window signals are a periodic binary signal having an amplitude (magnitude) of 0 during time periods (windows) P and an amplitude of 1 between time windows P. Generator 120 may determine time periods P based on window configuration control signal win_config and trigger signal trig (e.g., where time periods P are time-aligned with frequencies of the chirp signals that overlap interference frequencies INF).

Multiplier 94 may multiply the chirp signals shown in plot 124 with the window signals shown in plot 126 to produce muted chirp signals chrip' as shown in plot 128 of FIG. 5. When multiplied by the chirp signals, the zero magnitude of window signals win during time periods P may cause muted chirp signals chrip' to have zero magnitude during time periods P (e.g., without changing the chirp signals outside of time periods P). In frequency, muted chirp signals chrip' have zero magnitude between frequencies FA and FB (e.g., the frequencies corresponding to the edges of time periods P). Interference frequencies INF may lie between frequencies FA and FB (e.g., IFB−FAI may be greater than or equal to the bandwidth of interference frequencies INF and interference frequencies INF may overlap with or lie within the frequency range between frequencies FA and FB). In this way, sensing circuitry 28 may generate muted chirp signals chrip' that are silent (e.g., muted, attenuated, provided with zero amplitude/magnitude, provided with an attenuated amplitude/magnitude that is close to zero or otherwise substantially less than the amplitude/magnitude of the unmuted chirp signals at the same frequencies, etc.) at interference frequencies INF, thereby preventing interference with the radio-frequency signals conveyed by communications circuitry 26. The example of FIG. 5 is merely illustrative. The signals shown by plots 124, 126, and 128 may have other shapes in practice.

Figure 6:
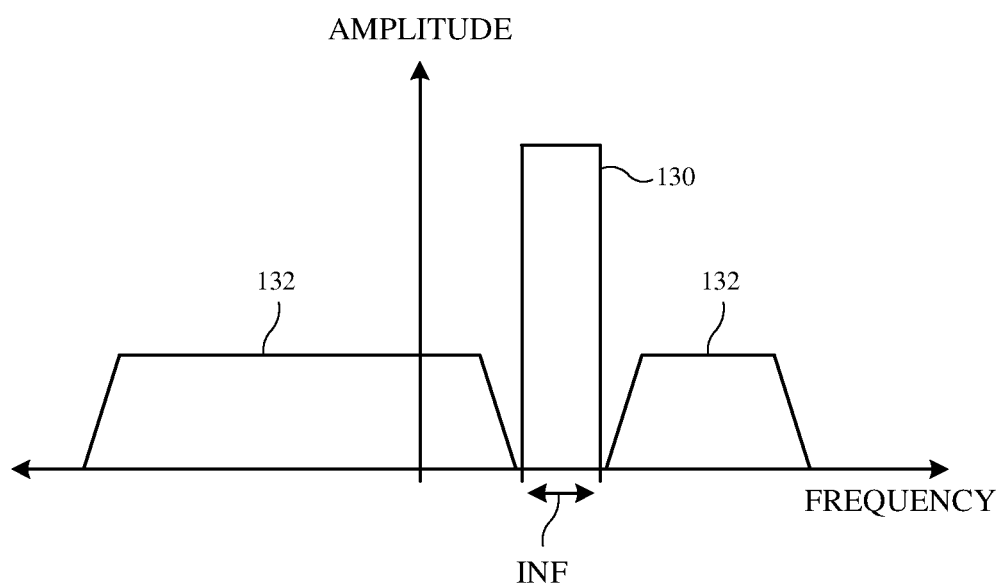
FIG. 6 is a plot of signal amplitude as a function of frequency showing how illustrative sensing circuitry may perform sensing operations that coexist with wireless communications performed by illustrative communications circuitry in accordance with some embodiments.

FIG. 6 is a plot of signal amplitude as a function of frequency showing how the signals transmitted by sensing circuitry 28 and communications circuitry 26 may coexist in frequency space. Curves 132 of FIG. 6 plots the sensing signals sigsens transmitted by sensing circuitry 28. Curve 130 plots the radio-frequency signals sigcom transmitted by communications circuitry 26. As shown but curves 132, muting the interference frequencies INF in sensing signals sigsens (e.g., by generating muted chirp signal chrip') may allow communications circuitry 26 to convey radio-frequency signals at interference frequencies INF without interfering with the sensing signals. Interference frequencies INF may cover a bandwidth of up to 400 MHz or higher, as an example.

Figure 7:
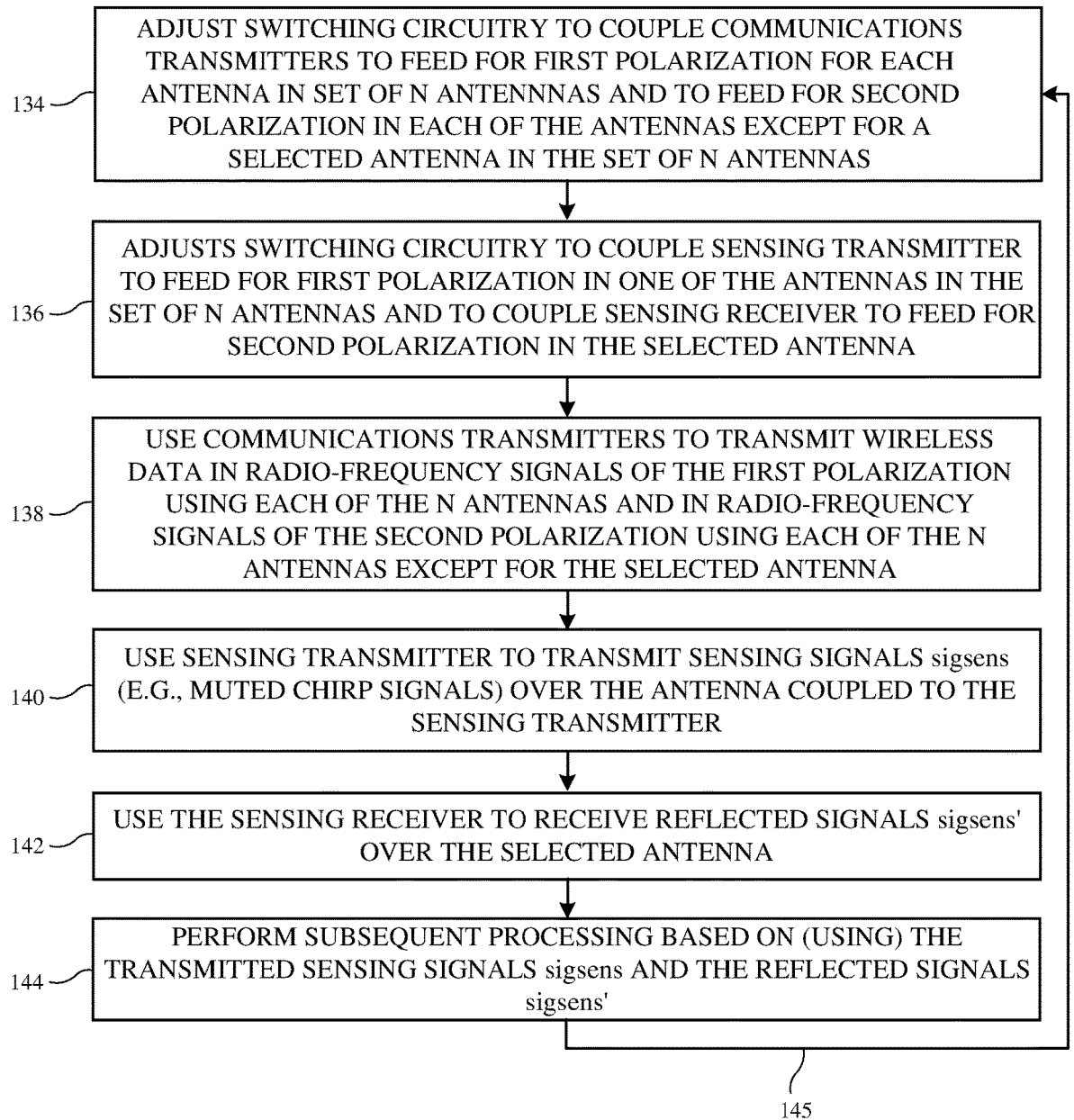
FIG. 7 is a flow chart of illustrative operations involved in using communications circuitry and sensing circuitry to perform concurrent wireless communications and sensing operations using the same set of antennas in accordance with some embodiments.

FIG. 7 is a flow chart of illustrative operations involved in using communications circuitry 26 and sensing circuitry 28 (FIG. 3) to perform concurrent wireless communications and sensing operations while leveraging the polarizations of antennas 30.

At operation 134, control circuitry 14 may adjust switching circuitry 50 and/or switching circuitry 80 of FIG. 3 to couple one or more transmitters in communications circuitry 26 to the H antenna feed (or the antenna feed of any first polarization) of each antenna 30 in a set of N antennas 30. For example, the switching circuitry may be adjusted to couple transmit ports 72H of communications circuitry 26 to the H antenna feed of antennas 30-1, 30-2, 30-3, and 30-4 of FIG. 3 (e.g., in a scenario where N=4). At the same time, control circuitry 14 may adjust switching circuitry 50 and/or switching circuitry 80 to couple one or more transmitters in communications circuitry 26 to the V antenna feed (or the antenna feed of any second polarization) of all but a selected one of the antennas 30 in the set of N antennas 30. For example, the switching circuitry may be adjusted to couple transmit ports 72V of communications circuitry 26 to the V antenna feed of antennas 30-1, 30-2, and 30-3 of FIG. 3 (e.g., in the scenario where N=4), whereas antenna 30-4 may be selected to use its V antenna feed for sensing operations rather than conveying wireless communications data.

At operation 136, control circuitry 14 may adjust switching circuitry 50 and/or switching circuitry 80 to couple sensing transmitter 76 to the H antenna feed (or the antenna feed of the first polarization) of one of the antennas 30 in the set of N antennas 30. For example, the switching circuitry may be adjusted to couple sensing transmitter 76 to the H antenna feed of antenna 30-1 of FIG. 3. At the same time, control circuitry 14 may adjust switching circuitry 50 and/or switching circuitry 80 to couple sensing receiver 78 to the V antenna feed (or the antenna feed of the second polarization) of the selected antenna 30 in the set of N antennas 30 (e.g., the antenna 30 having a vertical antenna feed that is not coupled to communications circuitry 26). For example, the switching circuitry may be adjusted to couple sensing receiver 78 to the V antenna feed of antenna 30-4 of FIG. 3. In this way, one of the polarizations of one of the antennas 30 is used for both performing sensing operations and conveying wireless communications data whereas one of the polarizations of another of the antennas 30 is used only to perform sensing operations without conveying wireless communications data.

At operation 138, the communications transmitter(s) in communications circuitry 26 may transmit radio-frequency signals sigcom with the first polarization using each of the antennas 30 in the set of N antennas 30. For example, transmit ports 72H may transmit H-polarized radio-frequency signals sigcom using antennas 30-1, 30-2, 30-3, and 30-4 of FIG. 3. At the same time, the communications transmitter(s) in communications circuitry 26 may transmit radio-frequency signals sigcom with the second polarization using each of the antenna 30 in the set of N antennas 30 except for the selected antenna 30 having a V antenna feed that is coupled to sensing receiver 78. For example, transmit ports 72V may transmit V-polarized radio-frequency signals sigcom using antennas 30-1, 30-2, and 30-3 of FIG. 3. The transmitted radio-frequency signals may collectively form radio-frequency signals 84 of FIG. 3, for example.

At operation 140, sensing transmitter 76 may transmit sensing signals sigsens (e.g., radio-frequency signals that include muted chirp signals chrip') with the first polarization over the antenna 30 coupled to sensing transmitter 76. For example, sensing transmitter 76 may transmit H-polarized sensing signals sigsens using antenna 30-1 of FIG. 3 (e.g., as radio-frequency signals 66 of FIG. 3).

At operation 142, sensing receiver 78 may receive reflected sensing signals sigsens' with the second polarization over the selected antenna 30 in the set of N antennas 30. For example, sensing receiver 78 may receive V-polarized reflected sensing signals sigsens' using antenna 30-4 of FIG. 3 (e.g., from reflected signals 70 of FIG. 3).

At operation 144, control circuitry 14 may perform subsequent processing based on (using) the transmitted sensing signals sigsens and the reflected sensing signals sigsens'. For example, control circuitry 14 may process sensing signals sigsens and reflected sensing signals sigsens' to identify (e.g., detect, compute, calculate, determine, deduce, etc.) the presence, location, orientation, position, and/or velocity of external object 68. Control circuitry 14 may perform any desired processing operations based on the identified presence, location, orientation, position, and/or velocity of external object 68. As examples, control circuitry 14 may use the detected presence, location, orientation, position, and/or velocity of external object 68 to identify a corresponding user input for one or more software applications running on device 10 such as a gesture input performed by the user's hand(s) or other body parts or performed by an external stylus, gaming controller, head-mounted device, or other peripheral devices or accessories, to determine when one or more antennas 30 needs to be disabled or provided with a reduced maximum transmit power level (e.g., when the one or more antennas 30 is being blocked by or is in close proximity to a human body part), to determine how to steer a radio-frequency signal beam produced by antennas 30 for communications circuitry 26 (e.g., to steer the signal beam formed by radio-frequency signals 66 of FIG. 3 around external object 68 so the signals can be properly received at external communications equipment 82 without subjecting external object 68 to excessive radio-frequency exposure), to map or model the environment around device 10 (e.g., to produce a software model of the room where device 10 is located for use by an augmented reality application, gaming application, map application, home design application, engineering application, etc.), to detect the presence of obstacles in the vicinity of (e.g., around) device 10 or in the direction of motion of the user of device 10, etc.

While illustrated sequentially in the example of FIG. 7 for the sake of clarity, operations 138-142 may be performed concurrently (e.g., in parallel). Because muted chirp signals chrip' (e.g., as transmitted at operation 140) are muted at interference frequencies INF, the transmitted sensing signals sigsens will not interfere with the radio-frequency signals sigcom transmitted by communications circuitry 26 (e.g., as transmitted at operation 138). This may allow device 10 to accurately detect the presence, location, position, orientation, and/or velocity of external object 68 while concurrently performing radio-frequency communications with external communications equipment 82 at satisfactory levels of radio-frequency performance using the same set of N antennas 30 in wireless circuitry 24. If desired, processing may loop from operation 144 back to operation 134 as shown by path 145 to update, change, or adjust the polarizations used for transmitting wireless communications data and sensing signals sigsens over time.

Figure 8:
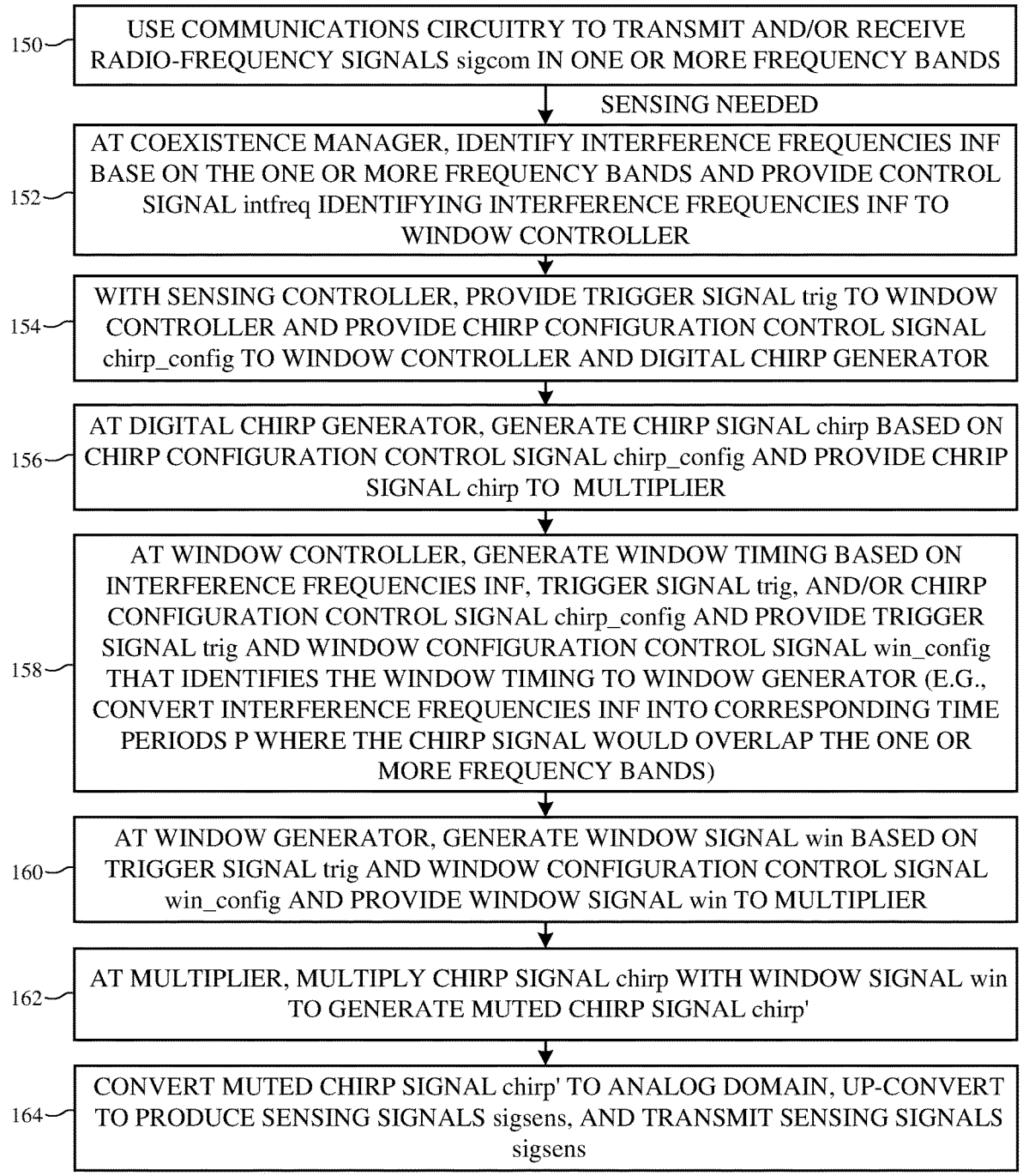
FIG. 8 is a flow chart of illustrative operations that may be performed by sensing circuitry to generate muted chirp signals for performing sensing operations without interfering with concurrent wireless communications in accordance with some embodiments.

FIG. 8 is a flow chart of illustrative operations involved in generating muted chirp signals chrip' for transmission using the set of N antennas 30. Operations 152-164 of FIG. 8 may, for example, be performed by sensing circuitry 28 of FIG. 4 while processing operation 140 of FIG. 7.

At operation 150, communications circuitry 26 may transmit and/or receive radio-frequency signals sigcom in one or more frequency bands. The frequency bands may span interference frequencies INF. When sensing operations are needed, processing may proceed to operation 152. Processing may proceed to operation 152 periodically, in response to a user input, in response to an application call by a software application running on device 10, or in response to any desired trigger condition.

At operation 152, coexistence manager 110 of FIG. 4 may identify (e.g., generate, determine, estimate, produce, etc.) interference frequencies INF based on the one or more frequency bands used by communications circuitry 26 to transmit and/or receive radio-frequency signals. Coexistence manager 110 may provide control signal intfreq identifying interference frequencies INF to window controller 116.

At operation 154, sensing controller 86 may provide trigger signal trig to window controller 116. Sensing controller 86 may also provide chirp configuration control signal chirp_config to window controller 116 and digital chirp generator 90.

At operation 156, digital chirp generator 90 may generate (e.g., synthesize, produce, output, etc.) chirp signals chirp (e.g., as shown by plot 124 of FIG. 5) based on chirp configuration control signal chirp_config. Digital chirp generator 90 may provide the chirp signal to multiplier 94.

At operation 158, window controller 116 may generate (e.g., identify, produce, compute, calculate, determine, deduce, estimate, etc.) window timing for window signal win based on the interference frequencies INF identified by control signal intfreq, trigger signal trig, and/or chirp configuration control signal chirp_config. Window controller 116 may provide window configuration control signal win_config and trigger signal trig to window generator 120. Window configuration control signal win_config may identify the window timing for window signal win. In other words, window controller 116 may convert interference frequencies INF into corresponding time periods P of FIG. 5 (e.g., window controller 116 may identify time periods P) based on chirp configuration control signal chirp_config and trigger signal trig.

At operation 160, window generator 120 may generate (e.g., produce, output, synthesize, etc.) window signal win (e.g., as shown by plot 126 of FIG. 5) based on trigger signal trig and window configuration control signal win_config. Window generator 120 may provide window signal win to multiplier 94.

At operation 162, multiplier 94 may multiply chirp signals chirp with window signal win to generate (e.g., produce, compute, calculate, output, etc.) muted chirp signals chrip' (e.g., as shown by plot 128 of FIG. 5). Multiplier 94 may provide muted chirp signals chrip' to DAC 98.

At operation 164, DAC 98 may convert muted chirp signals chrip' to the analog domain. Mixer 100 may upconvert muted chirp signals chrip' to radio frequencies, producing sensing signals sigsens. Sensing transmitter 76 may transmit sensing signals sigsens over transmit chain 60. Sensing transmitter 76 may also route sensing signals sigsens to de-chirp mixer 106 over de-chirp path 104 for de-chirp mixing with reflected sensing signals sigsens' to produce baseband signals sigbb. Control circuitry 14 may perform subsequent processing using baseband signals sigbb (e.g., at operation 144 of FIG. 7). The example of FIG. 8 is merely illustrative. Operations 150, 152, 154, 156, and/or 158 may be performed concurrently if desired.

If desired, control circuitry 14 may intelligently decide when communications circuitry 26 can sacrifice a polarization on one of the antennas 30 in the set of N antennas 30 for use in performing sensing operations (e.g., to determine when and/or how to perform operations 134-136 of FIG. 7 and operation 150 of FIG. 8). Control circuitry 14 may adjust switching circuitry 50 and/or 80 of FIG. 3 to place wireless circuitry 24 in a selected one of at least three operating modes or states.

Figure 9:
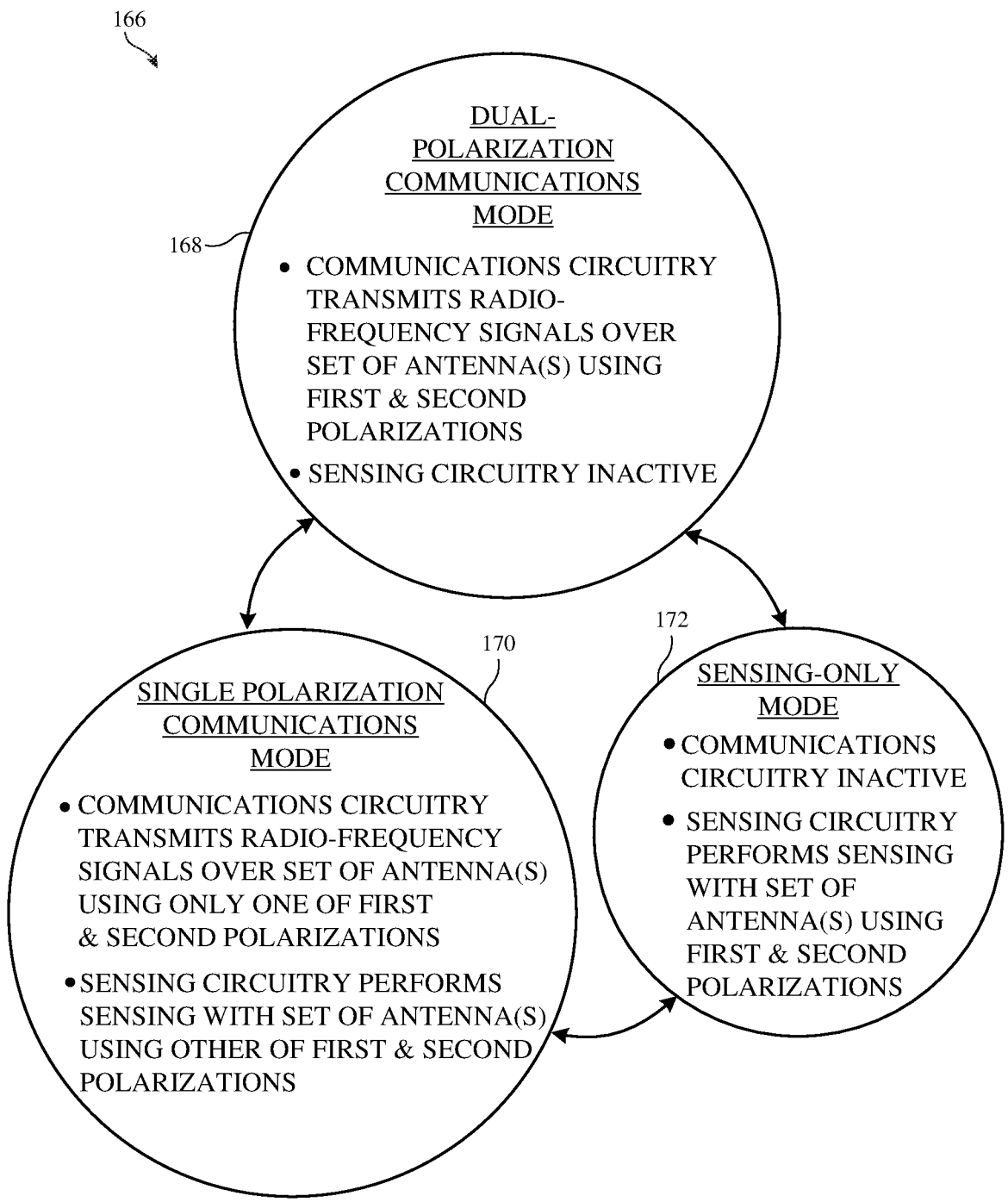
FIG. 9 is a state diagram showing illustrative operating modes for wireless circuitry involved in performing concurrent wireless communications and sensing operations in accordance with some embodiments.

A state diagram 166 of illustrative operating modes (states) for wireless circuitry 24 is shown in FIG. 9. As shown in FIG. 9, control circuitry 14 may place wireless circuitry 24 (and thus device 10) into one of three different operating modes such as a first operating mode 168 (sometimes referred to herein as dual-polarization communications mode 168), a second operating mode 170 (sometimes referred to herein as single polarization communications mode 170), and a third operating mode 172 (sometimes referred to herein as sensing-only mode 172).

Control circuitry may place wireless circuitry 24 into a selected one of modes 168-172 while processing operations 134-136 of FIG. 7, for example. If desired, control circuitry 24 may determine which of operating modes 168-172 to use based on the type of wireless communications data being conveyed or to be conveyed by communications circuitry 26. The type of wireless communications data being conveyed or to be conveyed by communications circuitry 26 may be determined by the communications protocol governing wireless communications by communications circuitry 26 (e.g., a 3GPP 5G NR FR2 protocol or other protocols) and/or by control signals or other commands transmitted to device 10 by external communications equipment 82 of FIG. 3, which is also be governed by the communications protocol. Control circuitry 14 may control switching circuitry 50 and/or 80 of FIG. 3 to place wireless circuitry 24 into a selected one of modes 168-172 at a given time and to transition wireless circuitry 24 between modes 168-172 as needed.

When wireless circuitry 24 is in dual-polarization communications mode 168, communications circuitry 26 may transmit radio-frequency signals sigcom over a set of one or more antennas 30 using both first and second polarizations (e.g., H and V polarizations). At the same time, sensing circuitry 28 is inactive (e.g., inactive on the set of one or more antennas 30). Control circuitry 14 may configure sensing circuitry 28 to be inactive by powering off sensing circuitry 28, by providing control signals to switching circuitry on power supply or enable lines for sensing circuitry 28, and/or by providing control signals to switching circuitry within sensing circuitry 28. When sensing circuitry 28 is inactive, some or all of sensing circuitry 28 may be disabled (e.g., powered off) or sensing circuitry 28 may remain powered on but without transmitting sensing signals sigsens over transmit chains 60 (e.g., sensing circuitry 28 may forego transmission of sensing signals sigsens). Communications circuitry 26 may have maximum throughput in dual-polarization communications mode 168 because no polarizations are sacrificed for performing sensing operations.

When wireless circuitry 24 is in single polarization communications mode 170, communications circuitry 26 may transmit radio-frequency signals sigcom over the set of one or more antennas 30 using only one of the first and second polarizations (e.g., using the H or V polarization). At the same time, sensing circuitry 28 may perform sensing operations using the set of one or more antennas 30 using the other of the first and second polarizations (e.g., using the V or H polarization). In other words, communications circuitry 26 may sacrifice a polarization for use during sensing operations. Performing communications using communications circuitry 26 and performing sensing operations using sensing circuitry 28 using respective polarizations may serve to prevent interference between the communications and sensing operations, for example.

For some communications protocols such as a 3GPP 5G NR FR2 protocol, the communications protocol may only allow certain types of wireless data or signals to be transmitted with just a single polarization. As examples, the protocol may allow single-polarization transmission when the transmitted radio-frequency signals include physical uplink control channel (PUCCH) signals, random access channel (RACH) signals, sounding reference signals (SRS) (e.g., depending on usage and the gNB configuration of external communications circuitry 82 of FIG. 3), or physical uplink shared channel (PUSCH) signals (e.g., depending on the gNB configuration of external communications circuitry 82), but may require using both the first and second polarization for transmitting other types of signals (e.g., data and/or control signals).

A single-polarization configuration for SRS may be possible when combined with antenna switching usage and a time division duplex (TDD) mode, when combined with codebook-based uplink transmission usage, no channel reciprocity, and when device 10 has no MIMO capability or MIMO capability with the gNB configuring SRS with one port in radio resource control (RRC) reconfiguration, when combined with non-codebook based uplink usage, channel reciprocity, and when the gNB asks device 10 to send SRS from one or two ports and then combines the results dynamically, or when combined with beam management usage, when beam correspondence is not supported, and when the gNB decides to use one port (e.g., depending if H and V beam shapes match), as examples. A single-polarization configuration for PUSCH may be possible with downlink channel information (DCI) format 0_0, when the number of codebook-based PUSCH transmission polarizations is determined by transmit precoding matrix index (TPMI) (based on associated SRS ports) from DCI 0_1 or RRC IE configuredGrantConfig, or when the number of non-codebook based PUSCH transmission polarizations is determined by SRS resource indicator (SRI) (based on associated SRS ports) from DCI 0_1 or RRC IE configuredGrantConfig, as examples. In general, simultaneous PUCCH and PUSCH transmission is not allowed by the protocol, but different PUSCH can be transmitted on different carriers. In case one of the carriers uses two polarizations, PUSCH in all carriers use two polarizations.

When wireless circuitry 24 is in sensing-only mode 172, communications circuitry 26 may be inactive. Control circuitry 14 may configure communications circuitry 26 to be inactive by powering off communications circuitry 26, by providing control signals to switching circuitry on power supply or enable lines for communications circuitry 26, and/or by providing control signals to switching circuitry within communications circuitry 26. When communications circuitry 26 is inactive, some or all of communications circuitry 26 may be disabled (e.g., powered off) or communications circuitry 26 may remain powered on but without transmitting sensing signals sigsens over transmit chains 60 (e.g., communications circuitry 26 may forego transmission of radio-frequency signals). At the same time, sensing circuitry 28 may perform sensing using the set of one or more antennas and one or both of the first and second polarizations (e.g., switching circuitry 80 and 50 of FIG. 3 may couple sensing circuitry 28 to one or both polarizations of one, more than one, or all of the antennas in the set of one or more antennas such as antennas 30-1 through 30-4 of FIG. 3). There may be no interference between communications circuitry 26 and sensing circuitry 28 in operating modes 168 and 172 because only one of communications circuitry 26 or sensing circuitry 28 is active at a given time in operating modes 168 and 172.

Figure 10:
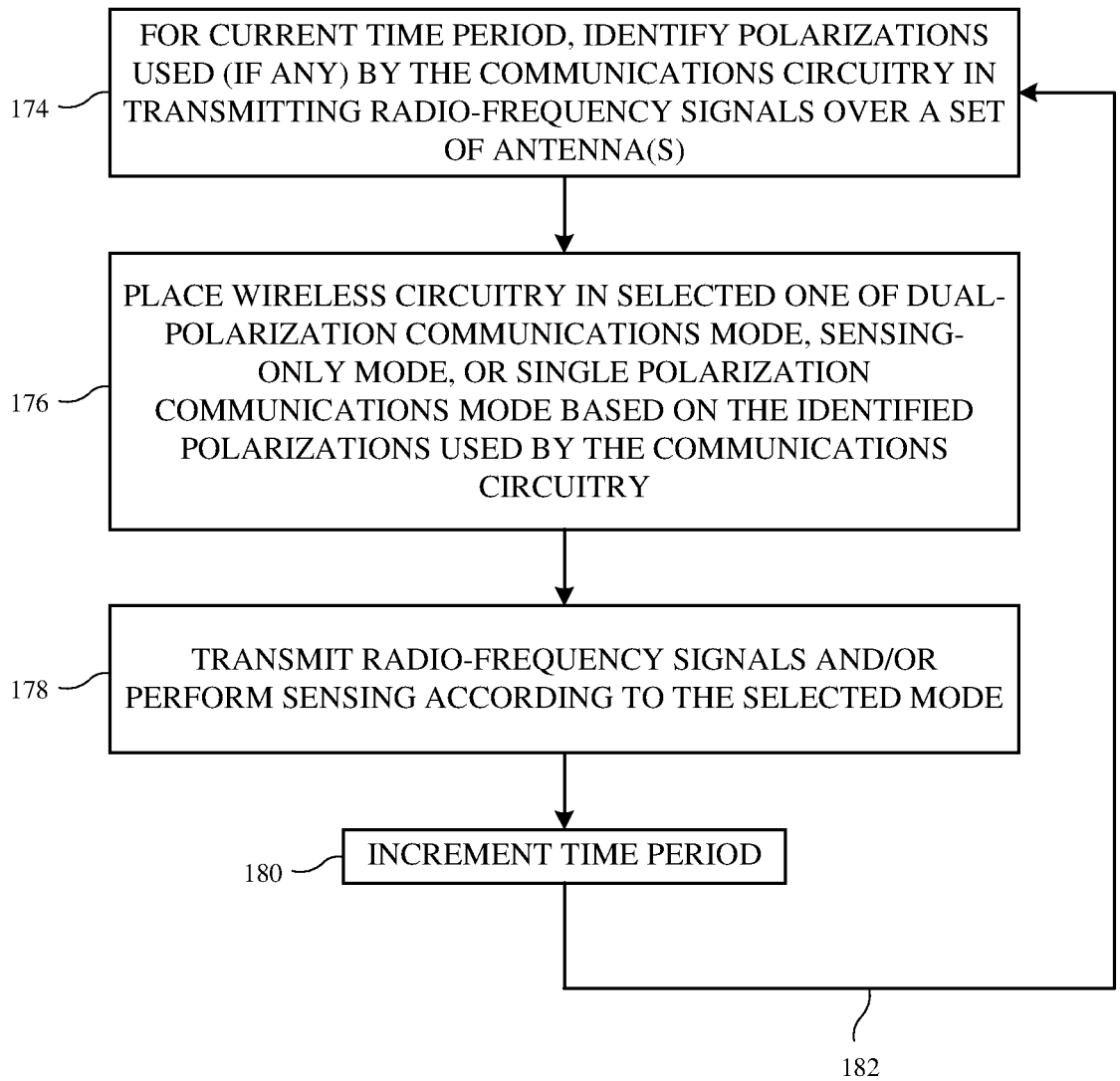
FIG. 10 is a flow chart of illustrative operations involved in adjusting wireless circuitry between operating modes for performing concurrent wireless communications and sensing operations in accordance with some embodiments.

FIG. 10 is a flow chart of illustrative operations involved in adjusting wireless circuitry 24 between operating modes 168-172 over time. At operation 174, control circuitry 14 may identify (determine) which polarizations are being used or are going to be used by communications circuitry 26 (if any) for a current time period. Control circuitry 14 may determine which polarizations are being used or are going to be used based on the communications protocol governing communications by communications circuitry 26. For example, control circuitry 14 may determine that communications circuitry 26 will use only a single polarization (e.g., H or V) when communications circuitry 26 is or will transmit PUCCH signals, RACH signals, SRS signals (e.g., given an appropriate gNB configuration), or PUSCH signals (e.g., given an appropriate gNB configuration) during the current time period, and may determine that communications circuitry 26 will use both polarizations when communications circuitry 26 is or will transmit other signals. Control circuitry 14 may also identify when communications circuitry 26 is not or is not going to transmit using either polarization (e.g., when communications circuitry 26 is inactive or not assigned uplink transmission slots for the current time period by external communications equipment 82). Operation 174 may, for example, be performed prior to operation 134 of FIG. 7 and/or during or prior to operation 150 of FIG. 8.

At operation 176, control circuitry 14 may place wireless circuitry 24 into a selected one of dual-polarization communications mode 168, single polarization communications mode 170, and sensing-only mode 172 based on the identified polarizations that are being or will be used by control circuitry 14 during the current time period. For example, control circuitry 14 may adjust switching circuitry 50 and/or 80 to place wireless circuitry 24 into dual-polarization mode 168 when communications circuitry 26 is or will transmit radio-frequency signals using both polarizations, may adjust switching circuitry 50 and/or 80 to place wireless circuitry 24 into single polarization mode 170 when communications circuitry 26 is or will transmit radio-frequency signals using a single polarization, and may adjust switching circuitry 50 and/or 80 to place wireless circuitry 24 into sensing-only mode 172 when communications circuitry 26 is or will be inactive. Operation 176 may, for example, be performed while processing operations 134-136 of FIG. 7 and/or prior to or during operation 150 of FIG. 8.

At operation 178, communications circuitry 26 may transmit radio-frequency signals sigcom and/or sensing circuitry 28 may transmit sensing signals sigsens using the set of one or more antennas 30 according to the selected operating mode. For example, when wireless circuitry 24 is in dual-polarization communications mode 168, communications circuitry 26 may transmit radio-frequency signals sigcom using both H and V polarizations. When wireless circuitry 24 is in single polarization communications mode 170, communications circuitry 26 may transmit radio-frequency signals sigcom using one polarization (e.g., the H or V polarization) while sensing circuitry 28 transmits sensing signals sigsens using the other polarization (e.g., the V or H polarization). When wireless circuitry 24 is in sensing-only mode 172, sensing circuitry 28 may transmit sensing signals sigsens using one or both polarizations while communications circuitry 26 is inactive. Operation 178 may, for example, be performed during operations 138-142 of FIG. 7.

At operation 180, the time period may be incremented and processing may loop back to operation 174 via path 182. This may allow control circuitry 14 to actively update the operating mode of wireless circuitry 14 based on the wireless data to be transmitted by communications circuitry 26 during each time period of a series (sequence) of time periods. In other words, control circuitry 14 may switch wireless circuitry 24 between the operating modes as needed over time.

FIG. 11 shows a table 184 that illustrates one example of how control circuitry 14 may adjust wireless circuitry 24 between operating modes over time depending on the polarizations required by communications circuitry 26 for transmission. In the example of FIG. 11, the one or more antennas of FIGS. 9 and 10 include antennas 30-1, 30-2, 30-3, and 30-4 of FIG. 3.

As shown by table 184 of FIG. 11, communications circuitry 26 may need to use antennas 30-1 through 30-4 to transmit radio-frequency signals using a single polarization such as the H polarization during a first time period T1. Control circuitry 14 may therefore place wireless circuitry 24 into single polarization communications mode 170 (e.g., at operation 176 of FIG. 10) during time period T1. This configures communications circuitry 26 to transmit horizontally-polarized radio-frequency signals using antennas 30-1 through 30-4 ("H COMMS") while sensing circuitry 28 concurrently transmits vertically-polarized sensing signals using antennas 30-1 through 30-4 ("V SENSING"). Sensing circuitry 28 may receive the corresponding reflected sensing signals using one or more of antennas 30-1 through 30-4 (e.g., using the V antenna feed for the antenna(s)).

During subsequent time periods T2 and T3 (e.g., during subsequent iterations of the operations of FIG. 10), communications circuitry 26 may need to use antennas 30-1 through 30-4 to transmit radio-frequency signals using both the H and V polarizations. Control circuitry 14 may therefore place wireless circuitry 24 into dual-polarization communications mode 168 during time periods T2 and T3. This configures communications circuitry 26 to transmit horizontally-polarized and vertically-polarized radio-frequency signals using antennas 30-1 through 30-4 ("H+V COMMS") while sensing circuitry 28 is concurrently inactive ("NO SENSING").

Figure 12:
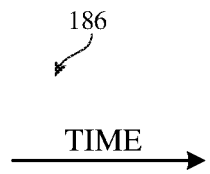
FIG. 12 is an illustrative table showing how wireless circuitry may transmit different types of communications signals using a single polarization while another polarization is used to perform concurrent sensing operations in accordance with some embodiments.

FIG. 12 shows a table 186 that illustrates another example of how control circuitry 14 may adjust wireless circuitry 24 between operating modes over time depending on the type of wireless signals to be transmitted by communications circuitry 26 (e.g., based on the communications protocol governing communications circuitry 26).

As shown by table 186 of FIG. 12, communications circuitry 26 may need to use antennas 30-1 through 30-4 to transmit PUCCH, RACH, SRS, or PUSCH signals during time period T1. These signals may support transmission using only a single polarization such as the H polarization (e.g., under the 3GPP 5G NR FR2 protocol). Control circuitry 14 may therefore place wireless circuitry 24 into single polarization communications mode 170 during time period T1. This configures communications circuitry 26 to transmit horizontally-polarized radio-frequency signals (e.g., H-polarized PUCCH, RACH, SRS or PUSCH signals) using antennas 30-1 through 30-4 while sensing circuitry 28 concurrently transmits vertically-polarized sensing signals using antennas 30-1 through 30-4. The PUCCH signals may include control information such as a hybrid-automatic repeat request (HARD) acknowledgement (ACK) or scheduling request (SR), channel state information (CSI)-P1, and/or CSI-P2 signals, as examples.

During subsequent time periods T2 and T3, communications circuitry 26 may need to use antennas 30-1 through 30-4 to transmit radio-frequency signals that include data and/or control information that requires use of both the H and V polarizations (e.g., according to the 3GPP 5G NR FR2 protocol). Such signals may include data and/or control information (e.g., data or control information and data) transferred on a PUSCH channel (e.g., when the gNB does not limit the configuration of PUSCH to one polarization). In general, data and/or control may need to be transferred using a PUSCH channel or, even for SRS, two polarizations may be needed to transfer control signals (e.g., without the gNB limiting the configuration to a single polarization). In other words, the channels used during time periods T2 and T3 may be PUSCH and/or SRS, but with two polarizations (e.g., rather than PUCCH and RACH which only use a single polarization under the protocol). Control circuitry 14 may therefore place wireless circuitry 24 into dual-polarization communications mode 168 during time periods T2 and T3. This configures communications circuitry 26 to transmit horizontally-polarized and vertically-polarized radio-frequency signals (e.g., containing data and/or control information) using antennas 30-1 through 30-4 while sensing circuitry 28 is concurrently inactive.

The examples of FIGS. 11 and 12 are merely illustrative. In general, control circuitry 14 may place wireless circuitry 24 into any of the operating modes during any of the time periods, there may be any number of time periods, the V and H polarizations shown in FIGS. 11 and 12 may be swapped or replaced with any desired first and second polarizations, and operations need not be the same for each antenna 30 (e.g., the set of one or more antennas in FIGS. 9 and 10 can include any desired number of antennas 30).

The example of FIGS. 3-12 in which coexistence manager 110 (FIG. 4) identifies the interference frequencies INF for generating muted chirp signals chrip' based on information identifying frequencies handled by communications circuitry 26 is merely illustrative. Additionally or alternatively, muted chirp signals chrip' may be generated to avoid any external interference in the air. To support this type of arrangement, sensing circuitry 28 may be provided with spectrum analyzer functionality to detect such potential over-the-air interference (e.g., interference frequencies) so muted chirp signals chrip' can be generated to avoid the over-the-air interference.

Figure 13:
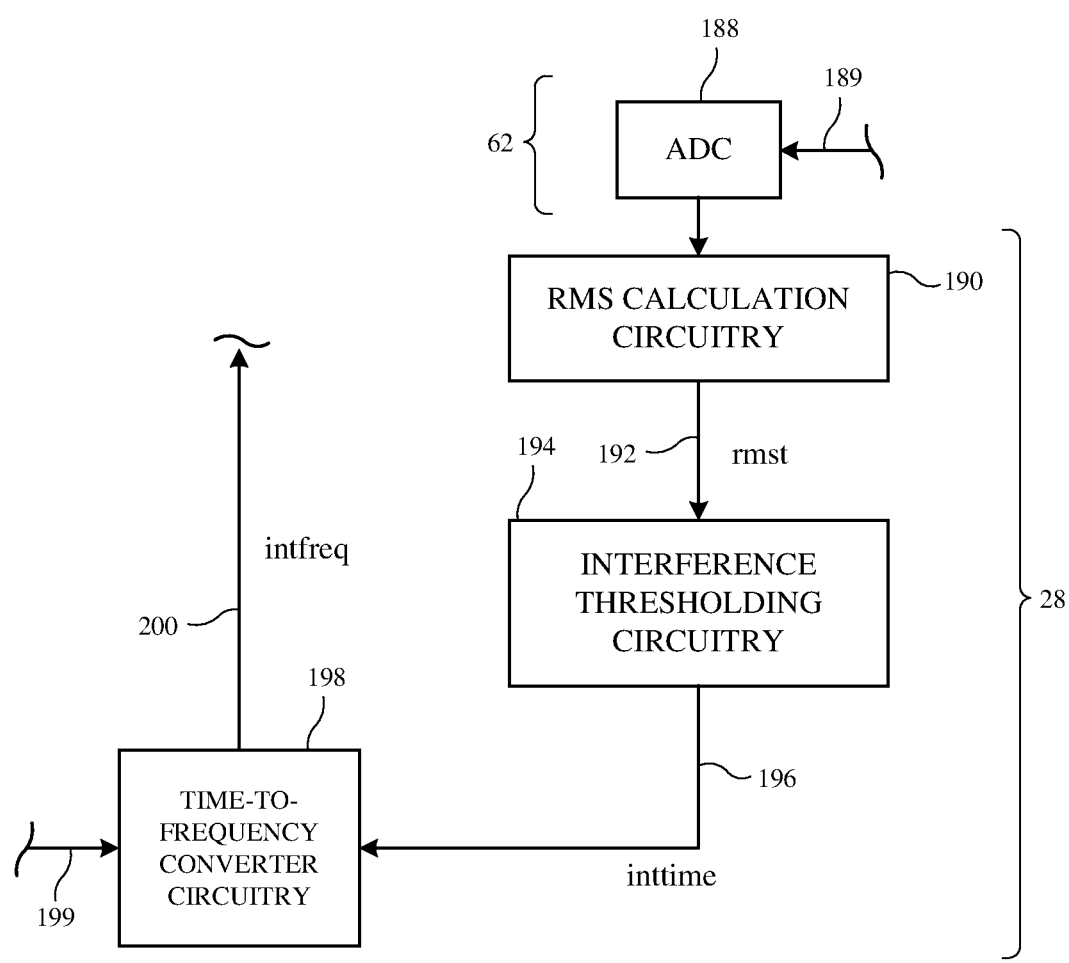
FIG. 13 is a circuit block diagram showing how illustrative sensing circuitry may include circuitry for identifying potential over-the-air interference frequencies that may be used in generating muted chirp signals for performing sensing operations in accordance with some embodiments.

FIG. 13 is a circuit block diagram showing one example of how sensing circuitry 28 may include circuitry for mitigating over-the-air interference. As shown in FIG. 13, sensing circuitry 28 may include root mean square (RMS) calculation circuitry 190, interference thresholding circuitry 194, and time-to-frequency converter circuitry 198. RMS calculation circuitry 190 may sometimes be referred to herein as RMS calculator 190 or RMS calculation engine 190. Interference thresholding circuitry 194 may sometimes be referred to herein as interference thresholder 194 or interference thresholding engine 194. Time-to-frequency converter circuitry 198 may sometimes be referred to herein as time-to-frequency converter 198 or time-to-frequency conversion engine 198. RMS calculation circuitry 190, interference thresholding circuitry 194, and time-to-frequency converter circuitry 198 may be implemented in software (e.g., running on storage circuitry and executed by one or more processors) and/or in hardware (e.g., using one or more digital logic gates, circuit components, diodes, transistors, switches, arithmetic logic units (ALUs), registers, application-specific integrated circuits, field-programmable gate arrays, one or more processors, look-up tables, etc.).

As shown in FIG. 13, receive chain 62 (e.g., the receive chain coupled to sensing receiver 78 of FIG. 3) may include an ADC such as ADC 188. ADC 188 may be the same ADC as ADC 108 of FIG. 4 or may be a different ADC in receive chain 62. ADC 188 may receive radio-frequency signals at input 189. The radio-frequency signals may be received over-the-air by the antenna 30 coupled to receive chain 62 (e.g., antenna 30-4 of FIG. 1). ADC 188 may convert the received radio-frequency signals to the digital domain.

RMS calculation circuitry 190 may have an input coupled to ADC 188 and may have an output coupled to interference thresholding circuitry 194 over control path 192. RMS calculation circuitry 190 may generate (e.g., calculate, produce, compute, identify, etc.) the RMS of the received radio-frequency signals (in the digital domain) as a function of time. RMS calculation circuitry 190 may provide control signal rmst to interference thresholding circuitry 194 over control path 192. Control signal rmst may identify the RMS of the received radio-frequency signals as a function of time.

Interference thresholding circuitry 194 may have an output coupled to time-to-frequency converter 198 over control path 196. Interference thresholding circuitry 194 may identify interference times associated with when the RMS identified by control signal rmst should be considered as interference for sensing circuitry 28. For example, interference thresholding circuitry 194 may compare the RMS identified by control signal rmst to one or more threshold values (e.g., where the RMS values that exceed the threshold values may be considered as interference for sensing circuitry 28). Interference thresholding circuitry 194 may provide control signal inttime to time-to-frequency converter circuitry 198 over control path 196. Control signal inttime may identify the detected interference in the radio-frequency signals as a function of time.

Time-to-frequency converter circuitry 198 may have an additional input 199 that receives trigger signal trig and/or chirp configuration control signal chirp_config from sensing controller 86 (FIG. 4). Time-to-frequency converter circuitry 198 may convert the detected interference in the radio-frequency signals as a function of time into corresponding interference frequencies INF (e.g., based on the trigger signal trig and/or chirp configuration control signal chirp_config). Time-to-frequency converter circuitry 198 may generate control signal intfreq that identifies interference frequencies INF. Time-to-frequency converter circuitry 198 may provide control signal intfreq to window controller 116 (FIG. 4) over control path 200. Window controller 116 may use the control signal intfreq transmitted by time-to-frequency converter circuitry 198 instead of the control signal intfreq transmitted by coexistence manager 110 of FIG. 4 to generate muted chirp signals chrip', if desired. Muted chirp signals chrip' may thus be generated to actively mitigate any interference between sensing circuitry 28 and radio-frequency signals in the air around device 10.

Figure 14:
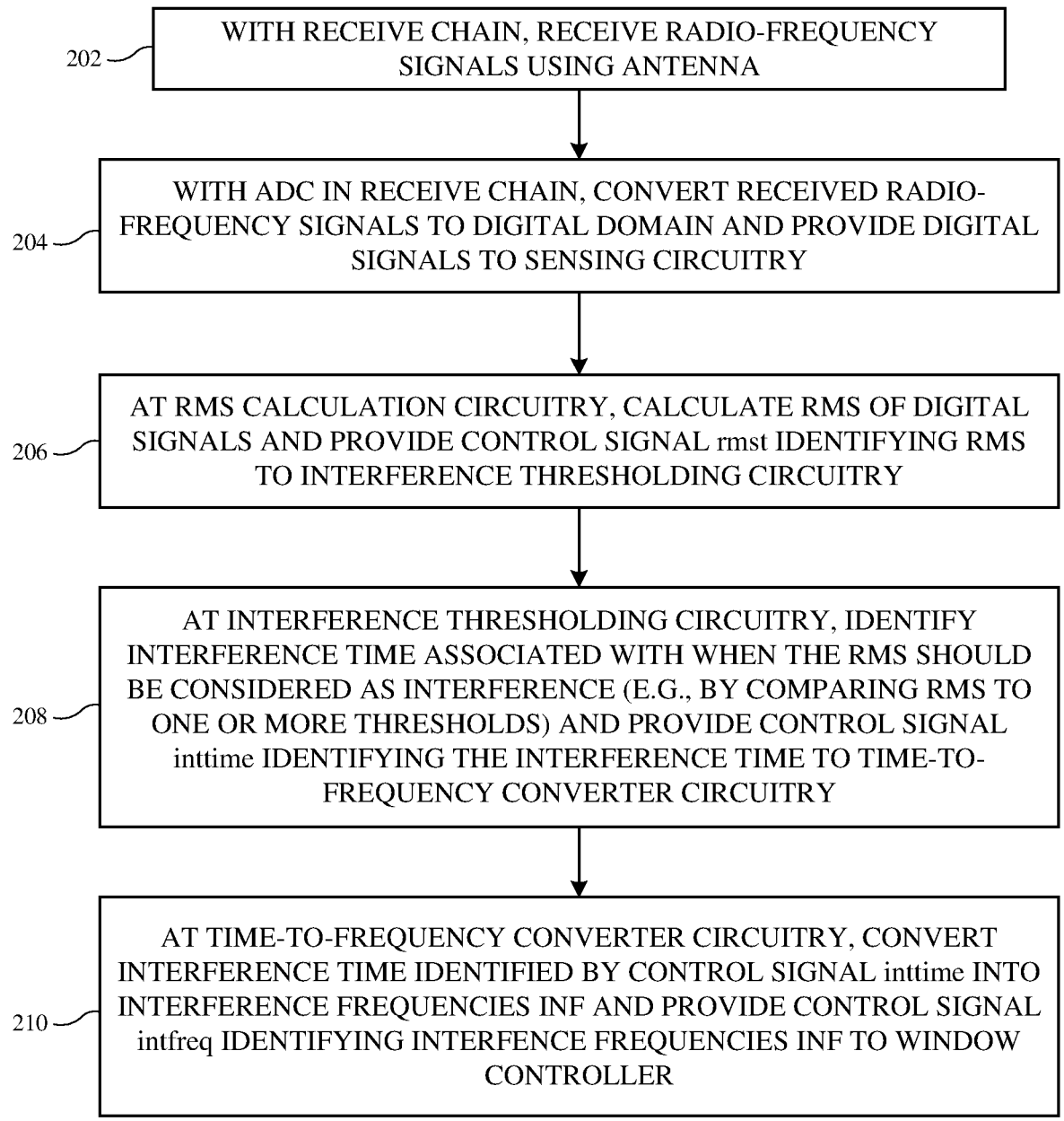
FIG. 14 is a flow chart of illustrative operations that may be performed by sensing circuitry to identify potential over-the-air interference frequencies that may be used in generating muted chirp signals for performing sensing operations in accordance with some embodiments.

FIG. 14 is a flow chart of illustrative operations that may be performed by sensing circuitry 28 to generate control signal intfreq identifying potential over-the-air interference frequencies for use in generating muted chirp signals chrip'.

At operation 202, receive chain 62 may receive radio-frequency signals from a corresponding antenna 30 (e.g., antenna 30-4 of FIG. 3).

At operation 204, ADC 188 may convert the received radio-frequency signals to the digital domain. ADC 188 may provide the converted radio-frequency signals to RMS calculation circuitry 190.

At operation 206, RMS calculation circuitry 190 may calculate the RMS of the digital-domain signals received from ADC 188. RMS calculation circuitry 190 may provide control signal rmst identifying the RMS to interference thresholding circuitry 194.

At operation 208, interference thresholding circuitry 194 may process the RMS identified by control signal rmst to identify the interference time associated with when the RMS should be considered as interference (e.g., by comparing the RMS to one or more threshold values). Interference thresholding circuitry 194 may provide control signal inttime identifying detected interference as a function of time to time-to-frequency converter 198.

At operation 210, time-to-frequency converter 198 may convert the interference as a function of time identified by control signal inttime into corresponding interference frequencies INF. Time-to-frequency converter 198 may provide control signal intfreq to window controller 116 (FIG. 4) that identify interference frequencies INF. Sensing circuitry 28 may then generate muted chirp signals chrip' that have zero magnitude at interference frequencies INF, thereby mitigating interference between sensing circuitry 28 and the over-the-air signals.

The operations described herein may allow for simultaneous wireless communications using communications circuitry 26 and sensing operations using sensing circuitry 28 (e.g., using the same set of antennas 30) without producing excessive interference between the wireless communications and the sensing operations. Performing sensing at the same time as performing wireless communications may serve to maximize the sensing airtime. Maximizing sensing airtime may, for example, relax requirements for the receiver design and noise figure in communications circuitry 26. Doubling sensing airtime may, for example, relax the noise figure requirement by as much as 3 dB.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-14 (e.g., the operations of FIGS. 7-12 and 14) may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. An electronic device comprising:
a first antenna having a first antenna feed and a second antenna feed;
a second antenna having a third antenna feed and a fourth antenna feed;
communications circuitry configured to concurrently transmit first radio-frequency signals with a first polarization over the first antenna feed, second radio-frequency signals with the first polarization over the third antenna feed, and third radio-frequency signals with a second polarization over the second antenna feed, the second polarization being different from the first polarization, wherein the first, second, and third radio-frequency signals carry wireless data for receipt by an external device;
a digital signal generator configured to generate a digital chirp signal;
a window generator configured to generate a binary periodic windowing signal;
a mixer operably coupled to the digital signal generator and the window generator, wherein the mixer is configured to generate a muted chirp signal by mixing the digital chirp signal with the binary periodic windowing signal, the first antenna feed being configured to transmit a radio-frequency sensing signal of the first polarization based on the muted chirp signal concurrent with transmission of the first radio-frequency signals by the communications circuitry; and
a sensing receiver configured to receive a reflected radio-frequency sensing signal of the second polarization over the fourth antenna feed.

2. The electronic device of claim 1, further comprising:
a digital-to-analog converter (DAC) operably coupled to the mixer and configured to convert the muted chirp signal into an analog muted chirp signal.

3. The electronic device of claim 2, further comprising:
an additional mixer coupled between the DAC and the first antenna feed, wherein the additional mixer is configured to generate the radio-frequency sensing signal by mixing the analog muted chirp signal with a local oscillator signal.

4. The electronic device of claim 3, wherein the muted chirp signal comprises a linear frequency ramp that varies from a first frequency at a first time to a second frequency at a second time and that varies from a third frequency at a third time to a fourth frequency at a fourth time, the second frequency being separated from the third frequency by a frequency range, the second time being separated from the third time by a muted period, and the communications circuitry being configured to transmit the first radio-frequency signals at a frequency within the frequency range.

5. The electronic device of claim 4, further comprising:
one or more processors configured to detect an external object based at least on the reflected radio-frequency sensing signal.

6. The electronic device of claim 5, wherein the sensing receiver is further configured to receive fourth radio-frequency signals with the second polarization over the third antenna feed, the one or more processors being configured to adjust the frequency range and the muted period of the muted chirp signal by adjusting the binary periodic windowing signal based on the fourth radio-frequency signals received by the sensing receiver.

7. The electronic device of claim 6, wherein the one or more processors is configured to:
generate a root mean square (RMS) of the fourth radio-frequency signals as a function of time,
compare the RMS of the fourth radio-frequency signals as a function of time to one or more thresholds to generate interference times, and
adjust the binary periodic windowing signal based on a conversion of the interference times to a frequency domain.

8. The electronic device of claim 1, further comprising:
a third antenna having a fifth antenna feed and a sixth antenna feed, wherein the communications circuitry is configured to transmit fourth radio-frequency signals with the first polarization over the fifth antenna feed and being configured to transmit fifth radio-frequency signals with the second polarization over the sixth antenna feed, and wherein the first antenna, the second antenna, and the third antenna form part of a phased antenna array configured to produce a steerable signal beam using at least the first radio-frequency signals, the second radio-frequency signals, the third radio-frequency signals, the fourth radio-frequency signals, and the fifth radio-frequency signals.

9. A method of operating a system having communications circuitry, a sensing transmitter, a sensing receiver, a set of antennas, and one or more processors, the method comprising:
transmitting, using the communications circuitry, radio-frequency signals that carry wireless data with a first linear polarization over the set of antennas during a first time period;
generating, using a first mixer, a muted chirp signal by mixing a digital chirp signal with a binary periodic windowing signal;
generating, using a second mixer, a sensing signal by mixing the muted chirp signal with a local oscillator signal;
transmitting, using the sensing transmitter, the sensing signal with a second linear polarization over at least one antenna in the set of antennas concurrently with transmission of the radio-frequency signals by the communications circuitry during the first time period, the second linear polarization being orthogonal to the first linear polarization;
receiving, using the sensing receiver, a reflected version of the sensing signal; and
detecting, using the one or more processors, an external object based on the reflected version of the sensing signal received by the sensing receiver.

10. The method of claim 9, further comprising:
transmitting, using the communications circuitry, radio-frequency signals with the first linear polarization and with the second linear polarization over the set of antennas during a second time period that is different from the first time period, wherein the sensing transmitter is inactive during the second time period.

11. The method of claim 10, wherein the radio-frequency signals transmitted by the communications circuitry with the first linear polarization during the first time period comprise physical uplink control channel (PUCCH) signals, random access channel (RACH) signals, sounding reference signals (SRS), or physical uplink shared channel (PUSCH) signals and wherein the radio-frequency signals transmitted by the communications circuitry with the first linear polarization and the second linear polarization during the second time period comprise physical uplink shared channel (PUSCH) signals or SRS signals.

12. The method of claim 10, further comprising:
transmitting, using the sensing transmitter, the sensing signal with the first linear polarization and the second linear polarization over the set of antennas during a third time period that is different from the first time period and the second time period, wherein the communications circuitry is inactive during the third time period.

13. The method of claim 9, further comprising:
transmitting, using the sensing transmitter, the sensing signal with the first linear polarization and the second linear polarization over the set of antennas during a second time period that is different from the first time period, wherein the communications circuitry foregoes transmission of radio-frequency signals using the set of antennas during the second time period.

14. The method of claim 9, wherein the muted chirp signal comprises a frequency ramp that increases linearly from a first frequency at a first time to a second frequency at a second time and that increases linearly from a third frequency at a third time to a fourth frequency at a fourth time, the second frequency is separated from the third frequency by a frequency range, the second time is separated from the third time by a muted period, the binary periodic windowing signal has a magnitude of zero during the muted period, the binary periodic windowing signal has a magnitude of one between the first and second times and between the third and fourth times, and the radio-frequency signals are transmitted by the communications circuitry at a frequency within the frequency range.

15. A method of operating a system having one or more processors and wireless circuitry that includes a sensing transmitter, a sensing receiver, a first antenna, and a second antenna, the method comprising:
generating, using the sensing transmitter, a linear frequency ramp that varies from a first frequency at a first time to a second frequency at a second time and that varies from a third frequency at a third time to a fourth frequency at a fourth time, wherein the second time is separated from the third time by a muted period, the third frequency being separated from the second frequency by a range of frequencies;
transmitting, using the sensing transmitter, the linear frequency ramp over the first antenna;
receiving, using the sensing receiver, a reflected version of the linear frequency ramp over the second antenna;
detecting, using the one or more processors, an external object based at least on the reflected version of the linear frequency ramp received by the sensing receiver; and
transmitting, using a transmitter in the wireless circuitry, wireless data during the muted period and at a frequency within the range of frequencies.

16. The method of claim 15, wherein generating the linear frequency ramp comprises multiplying an un-muted frequency ramp by a binary periodic windowing signal having a magnitude of zero during the muted period.

17. The method of claim 16, wherein the binary periodic windowing signal has a magnitude of one from the first time to the second time and from the third time to the fourth time.

18. The method of claim 17, further comprising:
receiving, using the sensing receiver, radio-frequency signals over the second antenna; and
identifying the range of frequencies by
generating a root mean square of the received radio-frequency signals as a function of time,
identifying interference times based on the root mean square, and
converting the identified interference times to a frequency domain.

19. The method of claim 17, further comprising:
adjusting the muted period based on a change in a transmit frequency of the wireless data.

20. The method of claim 15, wherein the linear frequency ramp increases from the first time to the second time, increases from the third time to the fourth time, has a constant slope from the first time to the second time, and has the constant slope from the third time to the fourth time.

* * * * *